US012715616B2

(12) United States Patent
Mukae

(10) Patent No.: US 12,715,616 B2
(45) Date of Patent: Aug. 25, 2026

(54) FLYING OBJECT COPING SYSTEM, SURVEILLANCE GROUND CENTER, COPING GROUND CENTER, COMMUNICATION ROUTE SEARCH DEVICE, FLIGHT PATH PREDICTION DEVICE, AND COPING ASSET SELECTION DEVICE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 85 days.

(21) Appl. No.: 18/276,043

(22) PCT Filed: Feb. 16, 2022

(86) PCT No.: PCT/JP2022/006104
§ 371 (c)(1),
(2) Date: Aug. 7, 2023

(87) PCT Pub. No.: WO2022/176892
PCT Pub. Date: Aug. 25, 2022

(65) Prior Publication Data

US 2024/0109674 A1 Apr. 4, 2024

(30) Foreign Application Priority Data

Feb. 19, 2021 (JP) ................................ 2021-024771

(51) Int. Cl.
*B64G 1/10* (2006.01)
*F41H 11/02* (2006.01)

(52) U.S. Cl.
CPC ......... *B64G 1/1028* (2023.08); *B64G 1/1007* (2013.01); *B64G 1/1085* (2013.01); *F41H 11/02* (2013.01)

(58) Field of Classification Search
CPC .. B64G 1/1028; B64G 1/1007; B64G 1/1085; F41H 11/02
(Continued)

(56) References Cited

U.S. PATENT DOCUMENTS

| | | |
|---|---|---|
| 5,813,634 A | 9/1998 | Pizzicaroli et al. |
| 7,875,837 B1 | 1/2011 | Szabo et al. |

(Continued)

FOREIGN PATENT DOCUMENTS

| | | |
|---|---|---|
| CN | 106570253 B | 12/2019 |
| JP | 2000-193741 A | 7/2000 |

(Continued)

OTHER PUBLICATIONS

International Search Report mailed on Apr. 26, 2022, received for PCT Application PCT/JP2022/006101, filed on Feb. 16, 2022, 7 pages including English Translation.

(Continued)

*Primary Examiner* — Samarina Makhdoom
(74) *Attorney, Agent, or Firm* — XSENSUS LLP

(57) ABSTRACT

In a flying object coping system (1000), a surveillance ground center (311) transmits, to a communication ground center (321), an ID, time information, and position information of a surveillance satellite (100) which will transmit flying object information, an ID, time information, and position information of a surveillance satellite (100) which will receive the flying object information, and position information of a coping system (330). The communication ground center (321) is equipped with a communication route search device (470), which searches for a communication (Continued)

route for satellite information. The communication ground center (321) transmits directive commands to the communication satellite group of the communication system (320) based on a search result from the communication route search device (470).

24 Claims, 19 Drawing Sheets

(58) Field of Classification Search
USPC .......................................................... 342/452
See application file for complete search history.

(56) References Cited

U.S. PATENT DOCUMENTS 9,647,749 B2 5/2017 Krebs
2009/0326792 A1* 12/2009 McGrath ................ G01W 1/08 701/4
2010/0038490 A1 2/2010 Hofschuster et al.
2012/0029812 A1* 2/2012 Altwaijry .............. G06Q 10/04 701/531
2012/0316819 A1 12/2012 Martell et al.
2016/0094288 A1 3/2016 Krebs
2016/0299506 A1 10/2016 Bruggeman et al.
2018/0106898 A1 4/2018 Baskaran et al.
2024/0092506 A1 3/2024 Mukae

FOREIGN PATENT DOCUMENTS

JP 2008-137439 A 6/2008
JP 2011112284 A 6/2011
JP 2012220132 A 11/2012
WO WO-2014121197 A2 * 8/2014 ............ G01S 19/14
WO WO-2020250709 A1 * 12/2020 ............ B64G 1/425
WO WO-2020261481 A1 * 12/2020 .............. B64G 1/10
WO 2022176890 A1 8/2022

OTHER PUBLICATIONS

International Search Report mailed on Apr. 26, 2022, received for PCT Application PCT/JP2022/006102, filed on Feb. 16, 2022, 7 pages including English Translation.
International Search Report mailed on Apr. 26, 2022, received for PCT Application PCT/JP2022/006103, filed on Feb. 16, 2022, 7 pages including English Translation.
International Search Report mailed on Apr. 5, 2022, received for PCT Application PCT/JP2022/006104, filed on Feb. 16, 2022, 5 pages including English Translation.
International Search Report mailed on Apr. 5, 2022, received for PCT Application PCT/JP2022/006107, filed on Feb. 16, 2022, 5 pages including English Translation.
Notice of Reasons for Refusal mailed Dec. 26, 2023, in Japanese Application No. 2023-500882, 9 pages.
Notice of Reasons for Refusal mailed Dec. 26, 2023, in Japanese Application No. 2023-500884, 9 pages.
Office Action dated May 7, 2025 for corresponding Japanese patent application No. 2024-026799 (6 pages; with English translation).
Office Action dated Oct. 16, 2025 for the co-pending U.S. Appl. No. 18/276,046 (58 pages).
Office Action issued on Nov. 12, 2025 for co-pending U.S. Appl. No. 18/276,040 (129 pages).
Office Action dated Sep. 2, 2025 for the co-pending U.S. Appl. No. 18/276,041 (62 pages).
Office Action dated Jan. 30, 2026 for co-pending U.S. Appl. No. 18/276,041 (135 pages).
Office Action issued on Jul. 7, 2026 for related U.S. Appl. No. 18/276,041 (55 pages).

* cited by examiner

1000: FLYING OBJECT COPING SYSTEM

610: SATELLITE CONSTELLATION
310: SURVEILLANCE SYSTEM
SURVEILLANCE SATELLITE GROUP
320: COMMUNICATION SYSTEM
100
100
200
200
200
200
INCLINED ORBIT
330: COPING SYSTEM
311
321
331
SURVEILLANCE GROUND CENTER
COMMUNICATION GROUND CENTER
470
COMMUNICATION ROUTE SEARCH DEVICE
COPING GROUND CENTER
COPING ASSET SELECTION DEVICE
333
COPING ASSET
332
EARTH
520

620: SATELLITE
610: SATELLITE CONSTELLATION
600: SATELLITE CONSTELLATION FORMATION SYSTEM
622
COMMUNICATION DEVICE
700: GROUND FACILITY
930
INPUT INTERFACE
950
910 : PROCESSOR
COMMUNICATION DEVICE
921
MEMORY
911
SATELLITE CONSTELLATION FORMATION UNIT
922
AUXILIARY STORAGE DEVICE
940
OUTPUT INTERFACE

Fig. 3

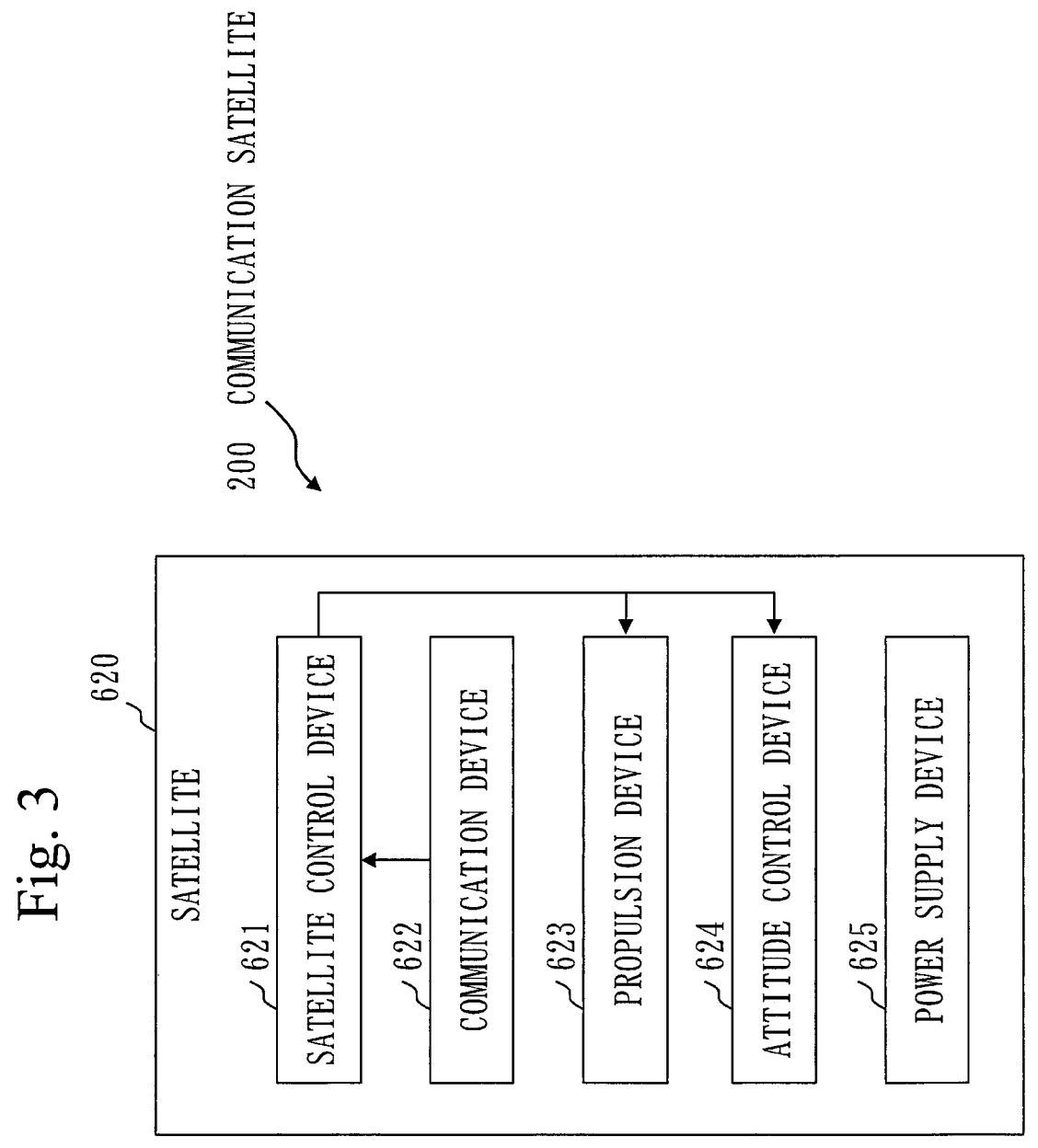

200 COMMUNICATION SATELLITE

620 SATELLITE

621 SATELLITE CONTROL DEVICE

622 COMMUNICATION DEVICE

623 PROPULSION DEVICE

624 ATTITUDE CONTROL DEVICE

625 POWER SUPPLY DEVICE

Fig. 4

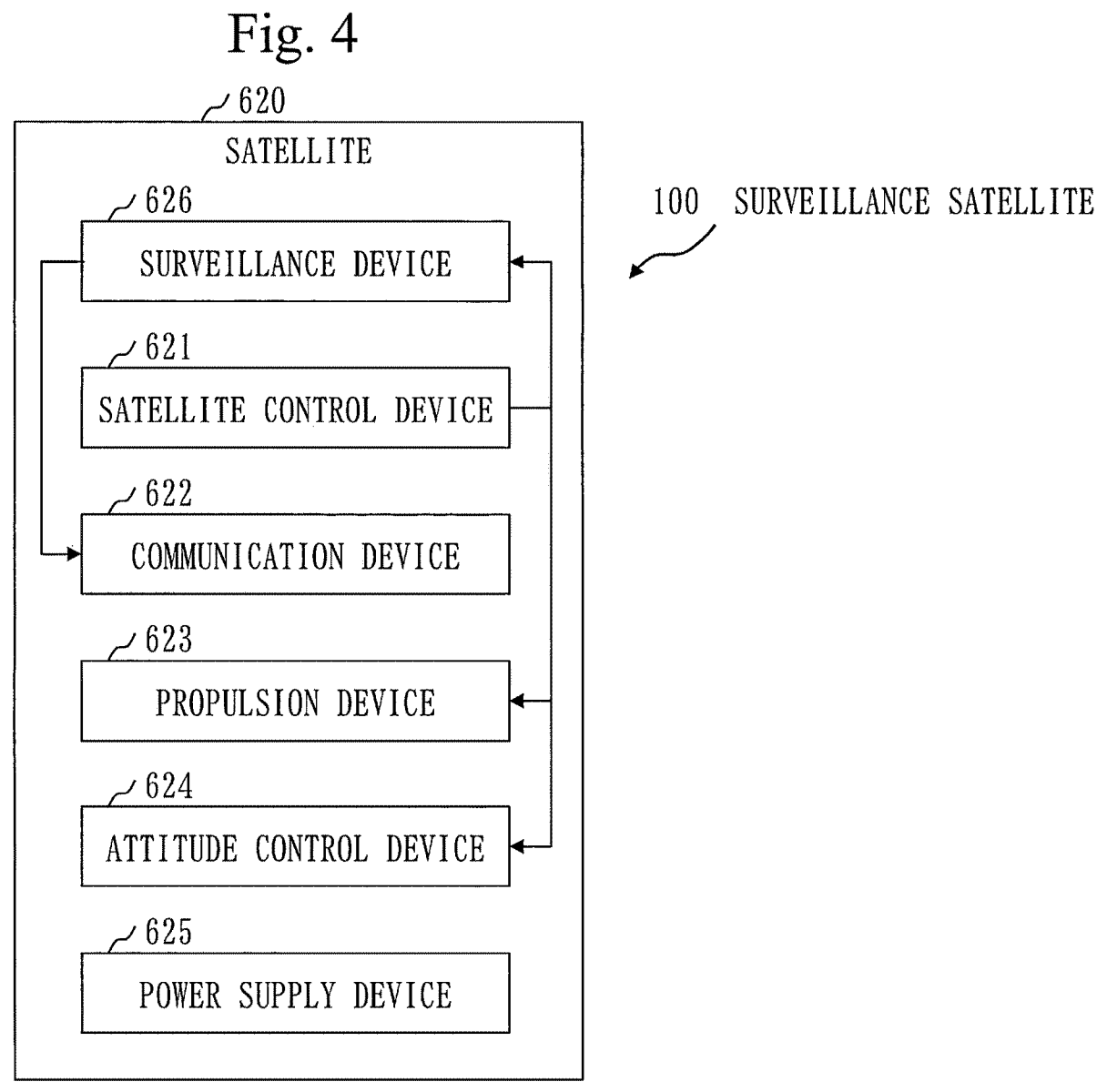

100 SURVEILLANCE SATELLITE

620 SATELLITE

626 SURVEILLANCE DEVICE

621 SATELLITE CONTROL DEVICE

622 COMMUNICATION DEVICE

623 PROPULSION DEVICE

624 ATTITUDE CONTROL DEVICE

625 POWER SUPPLY DEVICE

Fig. 6

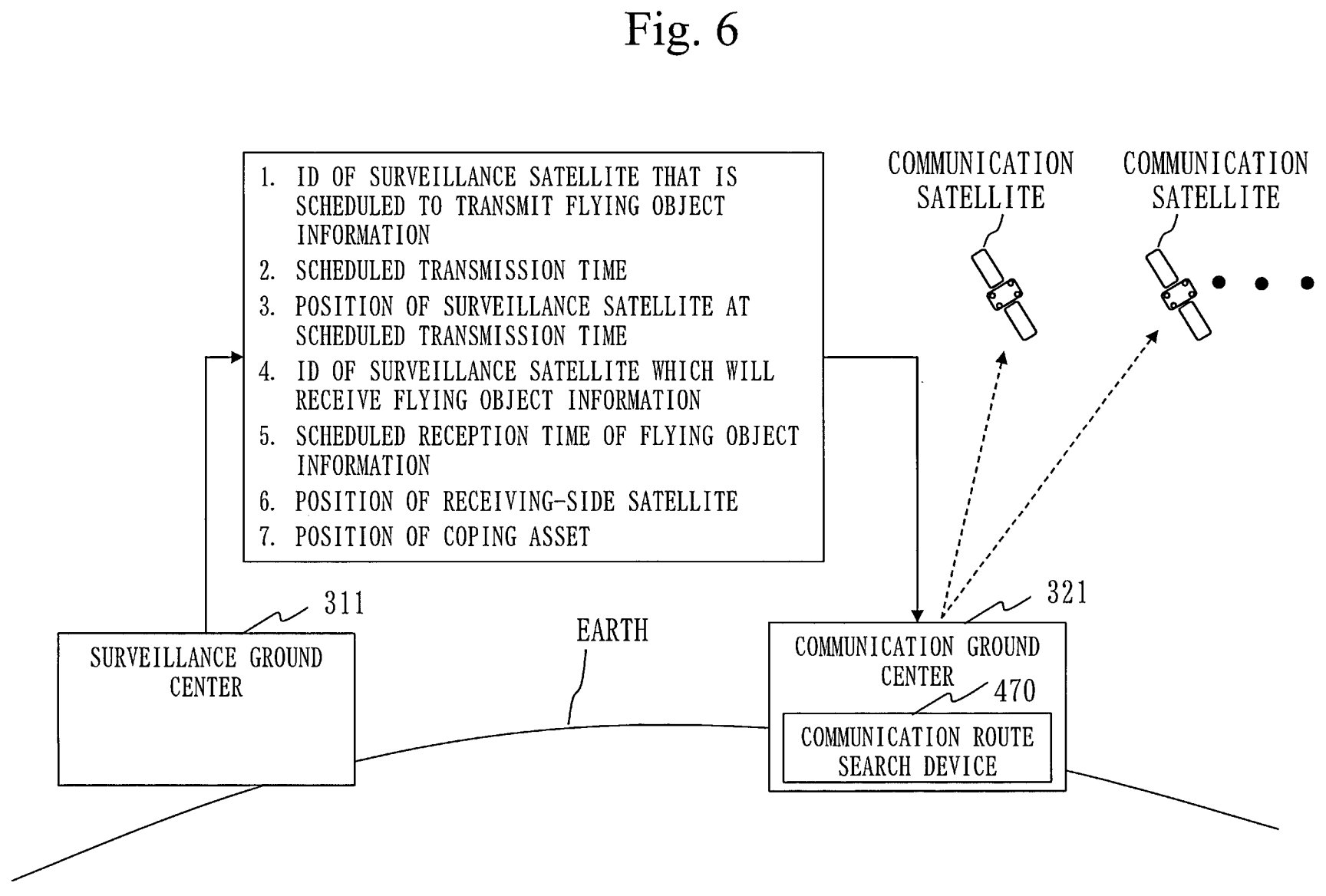

COMMUNICATION SATELLITE

COMMUNICATION SATELLITE

321

COMMUNICATION GROUND CENTER

470

COMMUNICATION ROUTE SEARCH DEVICE

1. ID OF SURVEILLANCE SATELLITE THAT IS SCHEDULED TO TRANSMIT FLYING OBJECT INFORMATION
2. SCHEDULED TRANSMISSION TIME
3. POSITION OF SURVEILLANCE SATELLITE AT SCHEDULED TRANSMISSION TIME
4. ID OF SURVEILLANCE SATELLITE WHICH WILL RECEIVE FLYING OBJECT INFORMATION
5. SCHEDULED RECEPTION TIME OF FLYING OBJECT INFORMATION
6. POSITION OF RECEIVING-SIDE SATELLITE
7. POSITION OF COPING ASSET

EARTH

311

SURVEILLANCE GROUND CENTER

Fig. 7

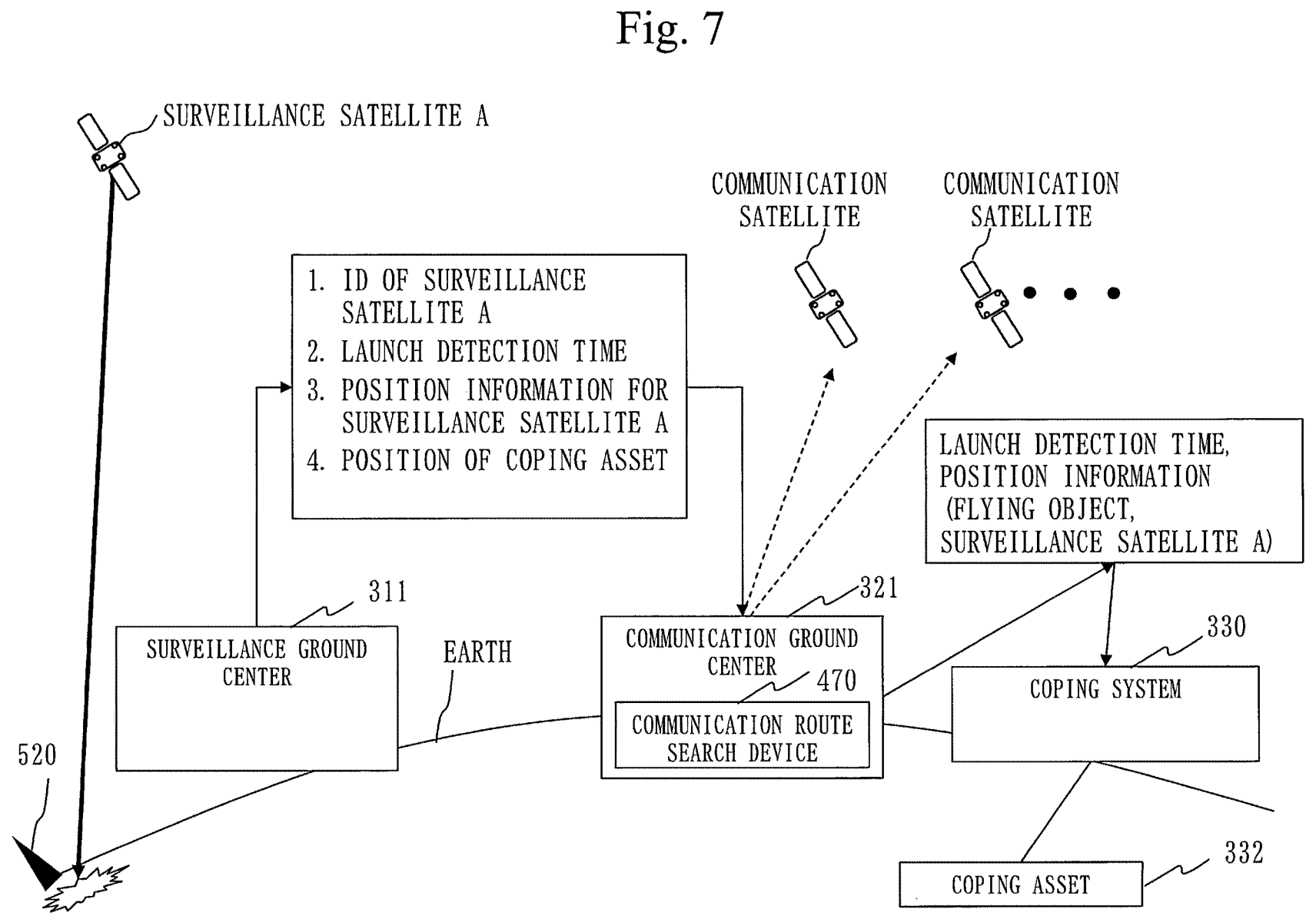

SURVEILLANCE SATELLITE A

COMMUNICATION SATELLITE

COMMUNICATION SATELLITE

1. ID OF SURVEILLANCE SATELLITE A
2. LAUNCH DETECTION TIME
3. POSITION INFORMATION FOR SURVEILLANCE SATELLITE A
4. POSITION OF COPING ASSET

LAUNCH DETECTION TIME, POSITION INFORMATION (FLYING OBJECT, SURVEILLANCE SATELLITE A)

330

COPING SYSTEM

332

COPING ASSET

321

COMMUNICATION GROUND CENTER

470

COMMUNICATION ROUTE SEARCH DEVICE

EARTH

311

SURVEILLANCE GROUND CENTER

520

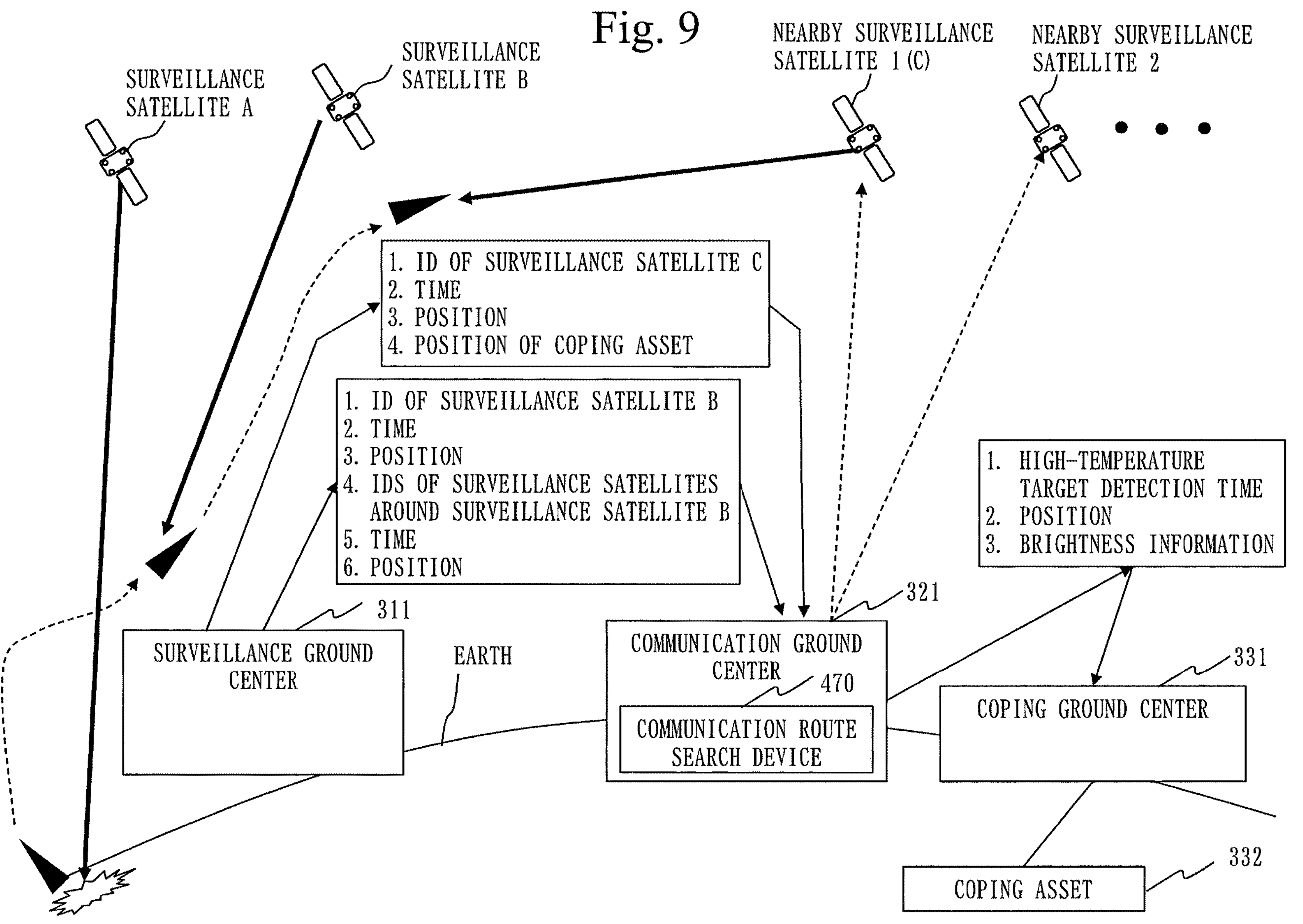
Fig. 9
SURVEILLANCE SATELLITE A
SURVEILLANCE SATELLITE B
NEARBY SURVEILLANCE SATELLITE 1 (C)
NEARBY SURVEILLANCE SATELLITE 2
1. ID OF SURVEILLANCE SATELLITE C
2. TIME
3. POSITION
4. POSITION OF COPING ASSET
1. ID OF SURVEILLANCE SATELLITE B
2. TIME
3. POSITION
4. IDS OF SURVEILLANCE SATELLITES AROUND SURVEILLANCE SATELLITE B
5. TIME
6. POSITION
1. HIGH-TEMPERATURE TARGET DETECTION TIME
2. POSITION
3. BRIGHTNESS INFORMATION
311
SURVEILLANCE GROUND CENTER
EARTH
321
COMMUNICATION GROUND CENTER
470
COMMUNICATION ROUTE SEARCH DEVICE
331
COPING GROUND CENTER
332
COPING ASSET

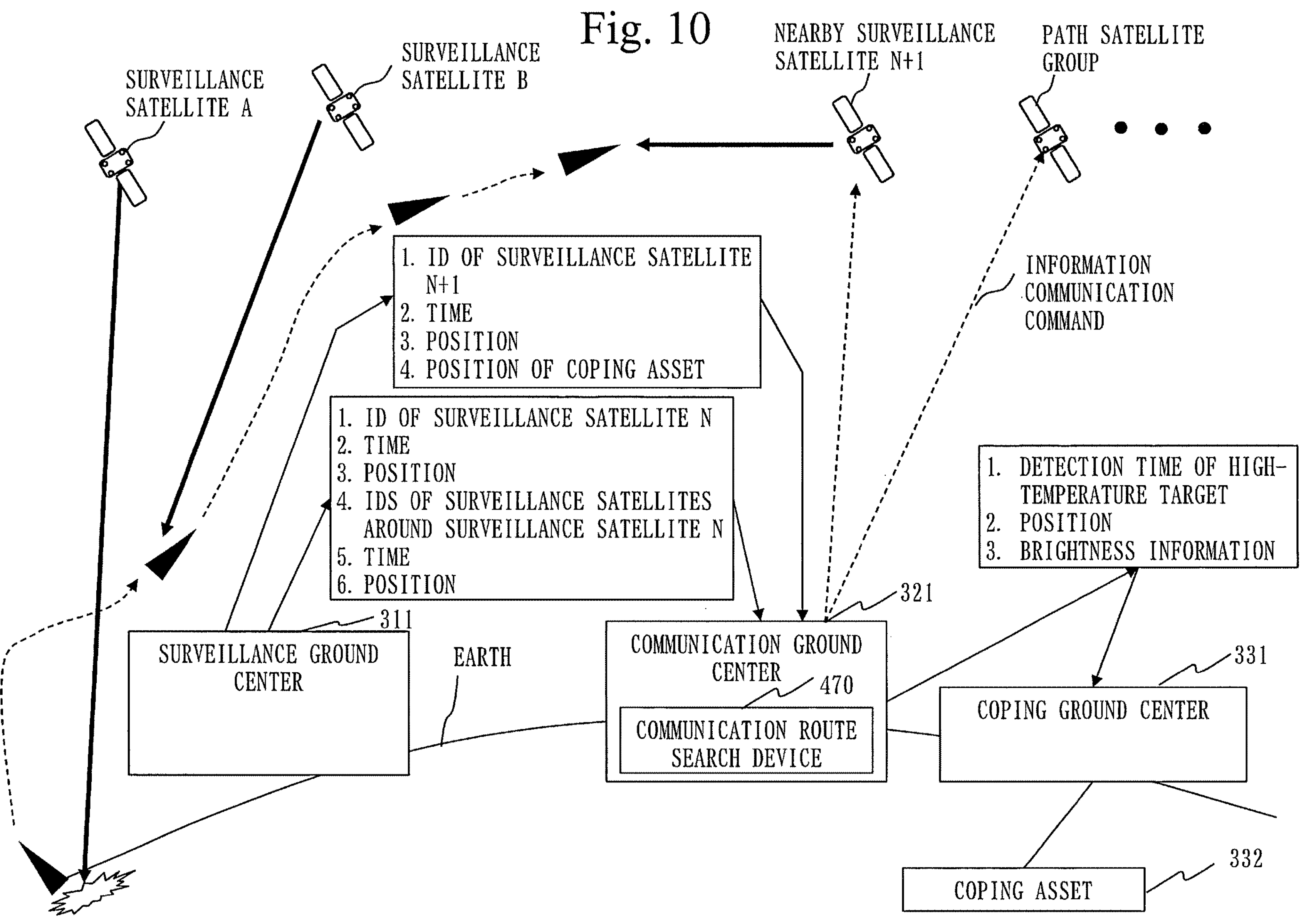
Fig. 10
SURVEILLANCE SATELLITE A
SURVEILLANCE SATELLITE B
NEARBY SURVEILLANCE SATELLITE N+1
PATH SATELLITE GROUP
INFORMATION COMMUNICATION COMMAND
1. ID OF SURVEILLANCE SATELLITE N+1
2. TIME
3. POSITION
4. POSITION OF COPING ASSET
1. ID OF SURVEILLANCE SATELLITE N
2. TIME
3. POSITION
4. IDS OF SURVEILLANCE SATELLITES AROUND SURVEILLANCE SATELLITE N
5. TIME
6. POSITION
1. DETECTION TIME OF HIGH-TEMPERATURE TARGET
2. POSITION
3. BRIGHTNESS INFORMATION
311
SURVEILLANCE GROUND CENTER
EARTH
321
COMMUNICATION GROUND CENTER
470
COMMUNICATION ROUTE SEARCH DEVICE
331
COPING GROUND CENTER
332
COPING ASSET

Fig. 11

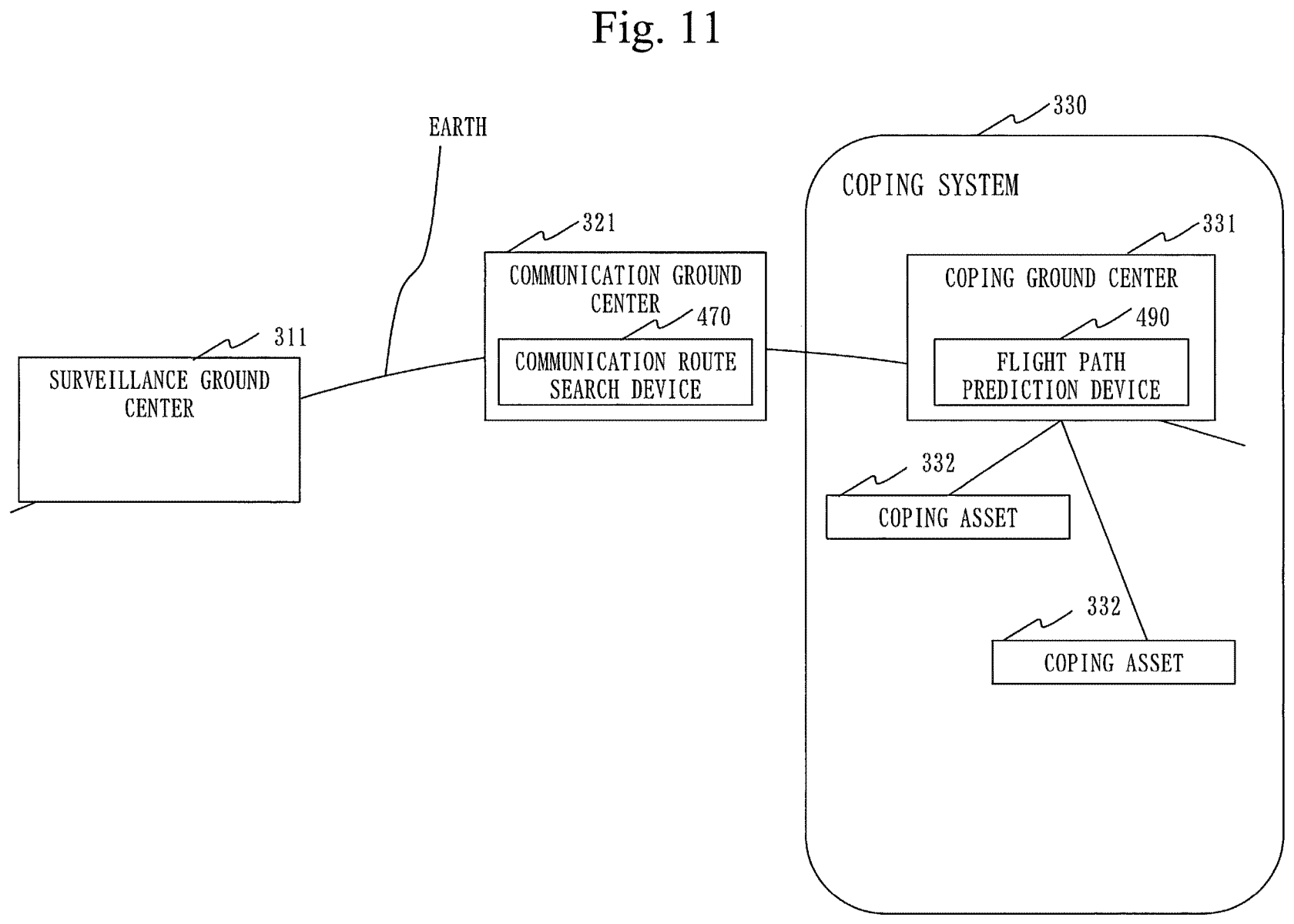

330
COPING SYSTEM
331
COPING GROUND CENTER
490
FLIGHT PATH PREDICTION DEVICE
332
COPING ASSET
332
COPING ASSET
321
COMMUNICATION GROUND CENTER
470
COMMUNICATION ROUTE SEARCH DEVICE
EARTH
311
SURVEILLANCE GROUND CENTER

Fig. 12

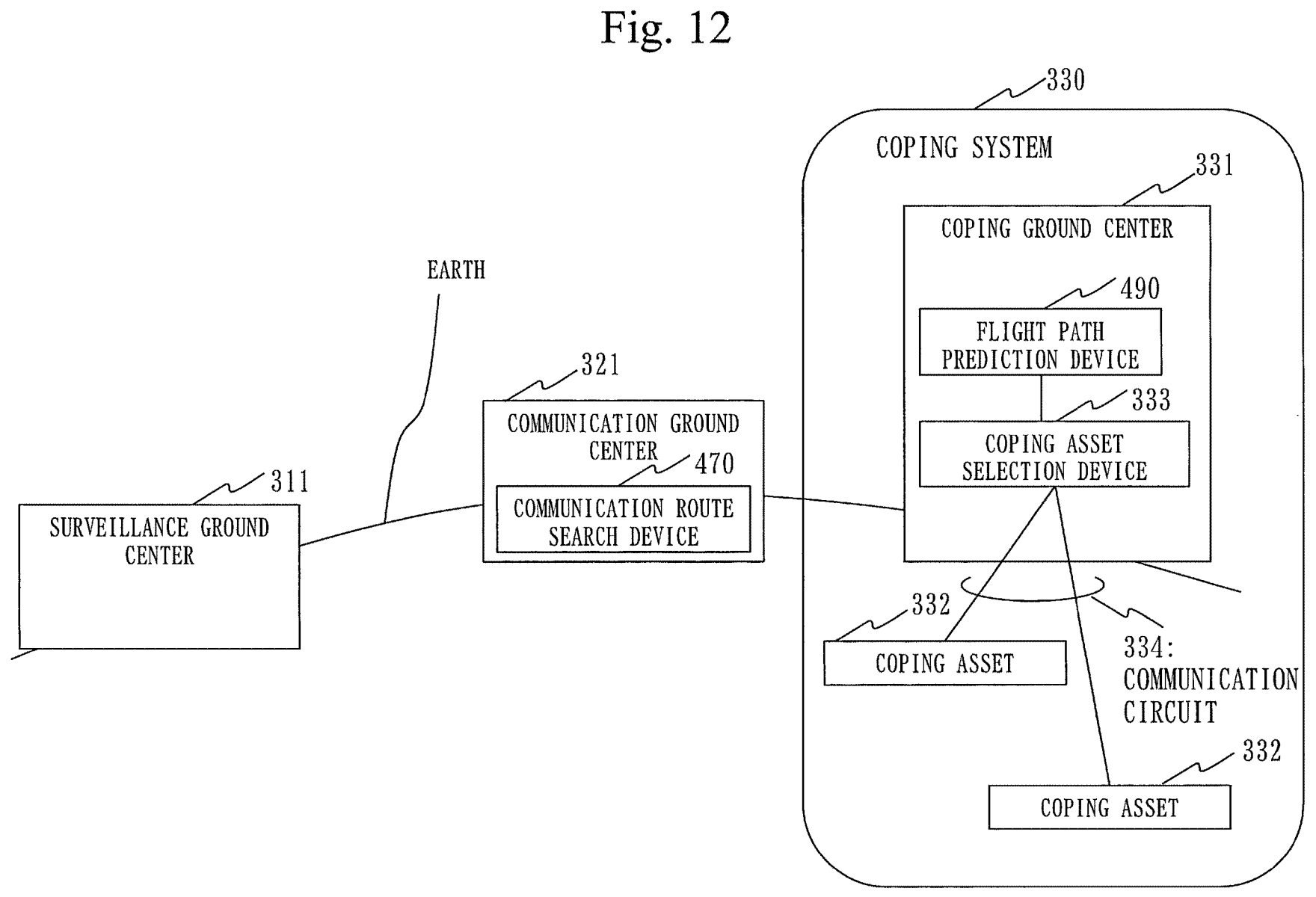

330 COPING SYSTEM
331 COPING GROUND CENTER
490 FLIGHT PATH PREDICTION DEVICE
333 COPING ASSET SELECTION DEVICE
334: COMMUNICATION CIRCUIT
332 COPING ASSET
332 COPING ASSET
321 COMMUNICATION GROUND CENTER
470 COMMUNICATION ROUTE SEARCH DEVICE
EARTH
311 SURVEILLANCE GROUND CENTER

330
COPING SYSTEM
331
EARTH
COPING GROUND CENTER
490
FLIGHT PATH PREDICTION DEVICE
333
COPING ASSET SELECTION DEVICE
332
COPING ASSET
334
311
SURVEILLANCE GROUND CENTER
1. ID
2. TIME
3. POSITION
321
COMMUNICATION GROUND CENTER
470
COMMUNICATION ROUTE SEARCH DEVICE

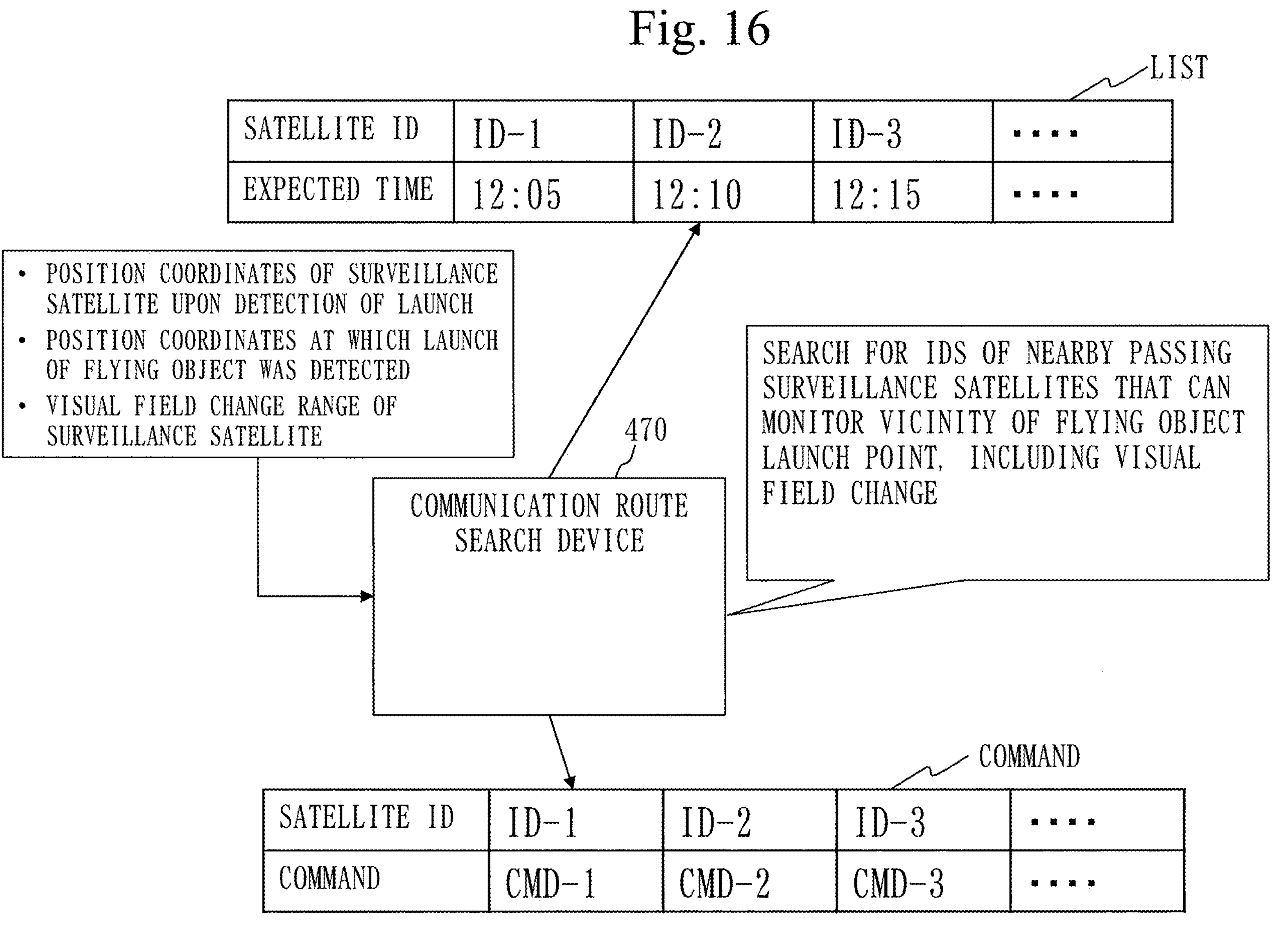
Fig. 16
LIST
SATELLITE ID | ID-1 | ID-2 | ID-3 | ....
EXPECTED TIME | 12:05 | 12:10 | 12:15 | ....
• POSITION COORDINATES OF SURVEILLANCE SATELLITE UPON DETECTION OF LAUNCH
• POSITION COORDINATES AT WHICH LAUNCH OF FLYING OBJECT WAS DETECTED
• VISUAL FIELD CHANGE RANGE OF SURVEILLANCE SATELLITE
470
COMMUNICATION ROUTE SEARCH DEVICE
SEARCH FOR IDS OF NEARBY PASSING SURVEILLANCE SATELLITES THAT CAN MONITOR VICINITY OF FLYING OBJECT LAUNCH POINT, INCLUDING VISUAL FIELD CHANGE
COMMAND
SATELLITE ID | ID-1 | ID-2 | ID-3 | ....
COMMAND | CMD-1 | CMD-2 | CMD-3 | ....

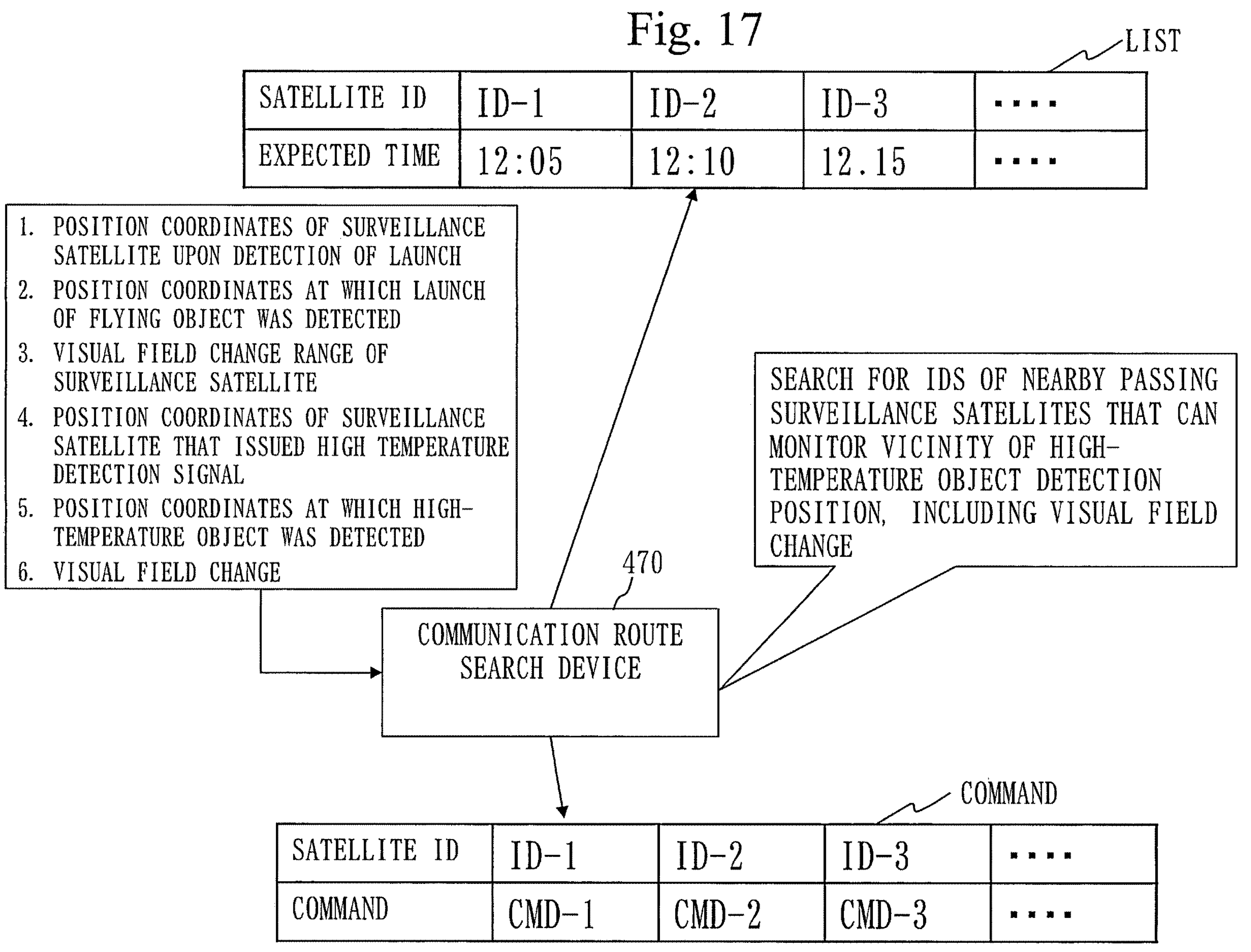
Fig. 17
LIST
SATELLITE ID
ID-1
ID-2
ID-3
....
EXPECTED TIME
12:05
12:10
12.15
....
1. POSITION COORDINATES OF SURVEILLANCE SATELLITE UPON DETECTION OF LAUNCH
2. POSITION COORDINATES AT WHICH LAUNCH OF FLYING OBJECT WAS DETECTED
3. VISUAL FIELD CHANGE RANGE OF SURVEILLANCE SATELLITE
4. POSITION COORDINATES OF SURVEILLANCE SATELLITE THAT ISSUED HIGH TEMPERATURE DETECTION SIGNAL
5. POSITION COORDINATES AT WHICH HIGH-TEMPERATURE OBJECT WAS DETECTED
6. VISUAL FIELD CHANGE
SEARCH FOR IDS OF NEARBY PASSING SURVEILLANCE SATELLITES THAT CAN MONITOR VICINITY OF HIGH-TEMPERATURE OBJECT DETECTION POSITION, INCLUDING VISUAL FIELD CHANGE
470
COMMUNICATION ROUTE SEARCH DEVICE
COMMAND
SATELLITE ID
ID-1
ID-2
ID-3
....
COMMAND
CMD-1
CMD-2
CMD-3
....

310: SURVEILLANCE SYSTEM
320: COMMUNICATION SYSTEM
330: COPING SYSTEM
331
490
333
COPING GROUND CENTER
FLIGHT PATH PREDICTION DEVICE
COPING ASSET SELECTION DEVICE
FLYING OBJECT INFORMATION
100
100
200
200
200
INCLINED ORBIT
EARTH

FLYING OBJECT COPING SYSTEM, SURVEILLANCE GROUND CENTER, COPING GROUND CENTER, COMMUNICATION ROUTE SEARCH DEVICE, FLIGHT PATH PREDICTION DEVICE, AND COPING ASSET SELECTION DEVICE

CROSS-REFERENCE TO RELATED APPLICATIONS

The present application is based on PCT filing PCT/JP2022/006104, filed Feb. 16, 2022, which claims priority from Japanese Patent Application No. 2021-024771, filed Feb. 19, 2021. This application is also related to U.S. patent application Ser. No. 18/276,041, entitled FLYING OBJECT COPING SYSTEM, SATELLITE UNIFIED ORDERING CENTER, COMMUNICATION ROUTE SEARCH DEVICE, FLIGHT PATH PREDICTION DEVICE, ABOVE-EQUATOR SATELLITE SYSTEM, ABOVE-EQUATOR SATELLITE, INCLINED ORBIT SATELLITE SYSTEM, INCLINED ORBIT SATELLITE, UNIFIED DATA LIBRARY, AND SATELLITE CONSTELLATION, filed Feb. 16, 2022; U.S. patent application Ser. No. 18/276,051; entitled FLYING OBJECT COPING SYSTEM, DEFENSE INFORMATION INTEGRATION CENTER, COMMUNICATION ROUTE SEARCH DEVICE, AND FLIGHT PATH PREDICTION DEVICE, filed Feb. 16, 2022; U.S. patent application Ser. No. 18/276,046; entitled FLYING OBJECT COPING SYSTEM, MONITORING GROUND CENTER, COMMUNICATION ROUTE SEARCH DEVICE, FLIGHT PATH PREDICTION DEVICE, POLAR ORBIT SATELLITE SYSTEM, POLAR ORBIT SATELLITE, INCLINED ORBIT SATELLITE SYSTEM, AND INCLINED ORBIT SATELLITE, filed Feb. 16, 2022; and U.S. patent application Ser. No. 18/276,040; entitled COMMUNICATION ROUTE SEARCH METHOD, GROUND SYSTEM, SURVEILLANCE SATELLITE CONSTELLATION, COMMUNICATION SATELLITE CONSTELLATION, FLYING OBJECT COPING SYSTEM, UNIFIED DATA LIBRARY, SATELLITE, AND SATELLITE CONSTELLATION, filed Feb. 16, 2022. The entire contents of each are incorporated herein by reference.

TECHNICAL FIELD

The present disclosure relates to a flying object coping system, a surveillance ground center, a coping ground center, a communication route search device, a flight path prediction device, and a coping asset selection device.

BACKGROUND ART

With the emergence of flying objects that glide at supersonic speed, there has recently been a desire for surveillance by satellites, such as detection of launching of a flying object, tracking of flight path, or prediction of a landing location.

A promising means for detecting and tracking a flying object in gliding phase is to detect a temperature rise caused by atmospheric friction when the flying object enters the atmosphere with infrared. For means of detecting a flying object in gliding phase with infrared, surveillance from a low-orbit satellite group is considered promising.

Patent Literature 1 discloses a surveillance satellite for exhaustively monitoring regions at a certain latitude on the entire earth surface with a small number of satellites orbiting in a low orbit.

CITATION LIST

Patent Literature

Patent Literature 1: JP 2008-137439

SUMMARY OF INVENTION

Technical Problem

In surveillance from a low orbit, the distance from an artificial satellite to a flying object is small compared to surveillance from a stationary orbit. This can enhance the performance of detection with infrared. Continuous surveillance by LEO satellites and maintaining of communication circuits require an enormous number of satellites and, furthermore, a flying position of an LEO satellite moves over time unlike a stationary satellite, which appears to be substantially locked relative to an earth fixed coordinate system. Thus, configurations of surveillance devices equipped with infrared surveillance devices and of a communication satellite group as well as ways of data transmission represent challenges.

An object of the present disclosure is to provide a flying object coping system in which the launch of a flying object is detected by means of a surveillance system having a group of surveillance satellites each equipped with a surveillance device, and a satellite information transmission system which forms a communication network from a group of the communication satellites, and flying object information is transmitted to a coping system in quasi-real time.

Solution to Problem

A flying object coping system includes:

a surveillance system, including a plurality of surveillance satellites each including a surveillance device and a communication device, and a surveillance ground center to transmit directive commands to the plurality of surveillance satellites;

a communication system, including a plurality of communication satellites each including a communication device, and a communication ground center to transmit directive commands to a communication satellite group which is a group of the plurality of communication satellites; and a coping system including coping assets which are located at least one of on land, in sea, and in air and cope with a flying object, wherein the surveillance system transmits flying object information generated through surveillance of the flying object to the coping system by way of the communication system, the surveillance ground center transmits, to the communication ground center, notification information including

- an ID of a surveillance satellite that is scheduled to transmit the flying object information,
- scheduled transmission time information indicating a scheduled transmission time of the flying object information,
- position information indicating a position of the surveillance satellites having said ID at the scheduled transmission time,
- an ID of another surveillance satellite that is scheduled to receive the flying object information, scheduled reception time information indicating a scheduled reception time of receiving the flying object information, and position information indicating a position of the other surveillance satellite at the scheduled reception time, the communication ground center includes a communication route search device which searches for a communication route for the flying object information, and the communication route search device generates a directive command based on the notification information transmitted from the surveillance ground center and transmits the generated directive command to the communication satellite group included in the communication system.

Advantageous Effects of Invention

With the flying object coping system according to the present disclosure, flying object information can be transmitted to a coping system in quasi-real time.

BRIEF DESCRIPTION OF DRAWINGS

FIG. 3 is a diagram of Embodiment 1, illustrating an example of configuration of a satellite 620 of the satellite constellation formation system 600.

FIG. 4 is a diagram of Embodiment 1, illustrating another example of configuration of the satellite 620 of the satellite constellation formation system 600.

FIG. 6 is a diagram of Embodiment 1, illustrating information transmitted from a surveillance ground center 311 to a communication ground center 321.

FIG. 7 is a diagram of Embodiment 1, illustrating information transmitted from the surveillance ground center 311 to the communication ground center 321.

FIG. 9 is a diagram of Embodiment 1, illustrating information transmitted from the surveillance ground center 311 to the communication ground center 321.

FIG. 10 is a diagram of Embodiment 1, illustrating information transmitted from the surveillance ground center 311 to the communication ground center 321.

FIG. 11 is a diagram of Embodiment 1, illustrating a flight path prediction device 490 of a coping system 330.

FIG. 12 is a diagram of Embodiment 1, where the coping system 330 has multiple coping assets.

FIG. 16 is a diagram of Embodiment 1, illustrating processing by the communication route search device 470.

FIG. 17 is a diagram of Embodiment 1, illustrating processing by the communication route search device 470.

DESCRIPTION OF EMBODIMENTS

Figure 1:
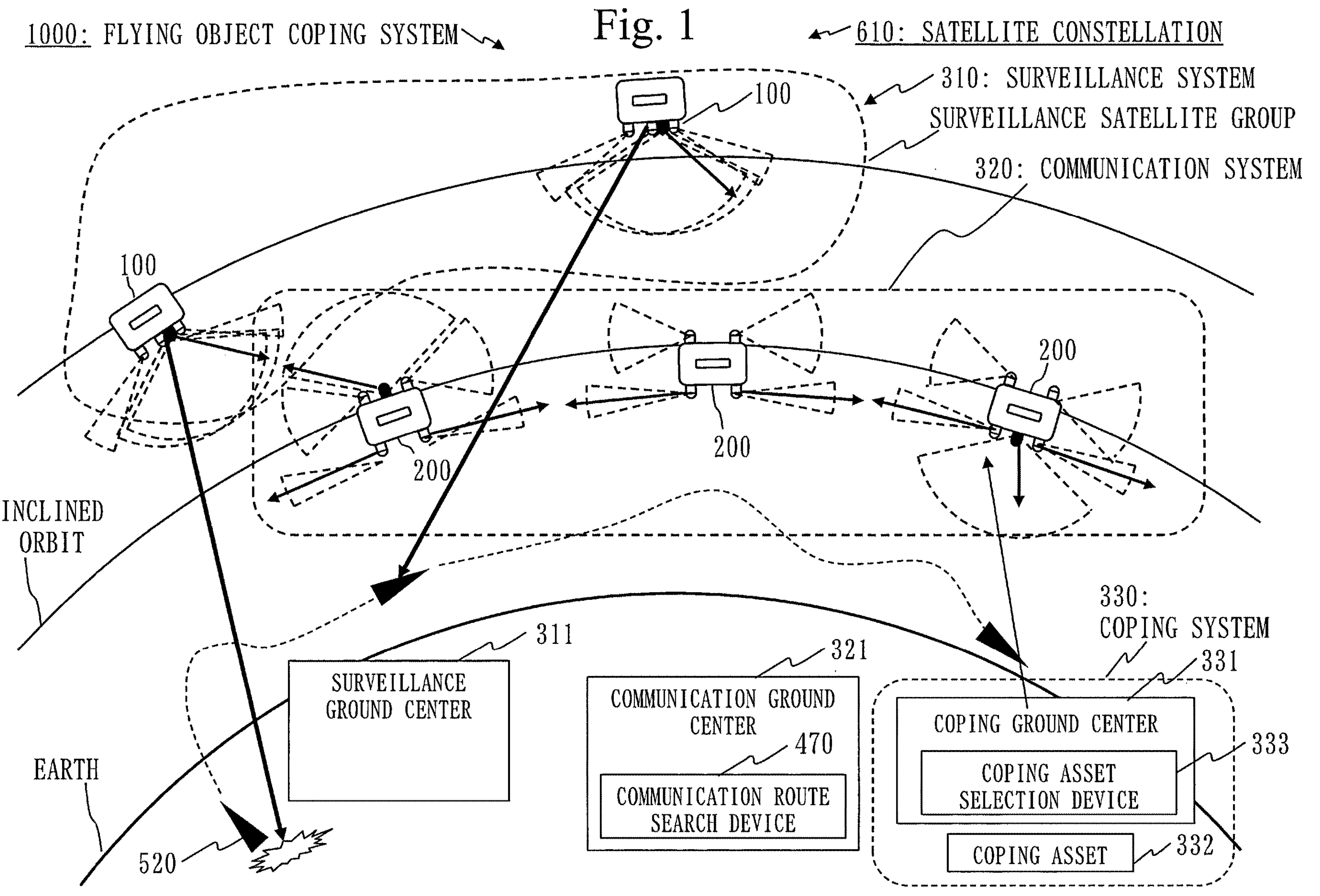
FIG. 1 is a diagram of Embodiment 1, illustrating an exemplary configuration of a flying object coping system 1000.

In the description of embodiments and drawings, the same elements and corresponding elements are given the same reference characters. Description of elements with the same reference character is omitted or simplified as appropriate. In the embodiments below, a "unit" may be read as "circuit", "step", "procedure", "process", or "circuitry" as appropriate.

Embodiment 1

FIG. 1 illustrates an exemplary configuration of a flying object coping system 1000. The flying object coping system 1000 includes a surveillance system 310, a communication system 320, and a coping system 330. The surveillance system 310 has multiple surveillance satellites 100, each equipped with a surveillance device and a communication device. The communication system 320 has multiple communication satellites 200, each equipped with a communication device. The coping system 330 is equipped with coping assets 332 on land, in sea, and in air for coping with a flying object 520.

In the flying object coping system 1000, the surveillance system 310 transmits flying object information generated through surveillance of the flying object 520 to the coping system 330 by way of the communication system 320.

The surveillance system 310 also has multiple surveillance satellites 100, each equipped with an infrared surveillance device. The surveillance system 310 detects launch plume of the flying object 520 and the flying object 520 flying with an increased temperature as a high-temperature target. Then, the surveillance system 310 transmits time information and position information for the flying object 520 as flying object information. Specifically, a surveillance satellite 100 detects launch plume of the flying object 520 and the flying object 520 flying with an increased temperature as a high-temperature target via the infrared surveillance device. Then, the surveillance system 310 transmits flying object information including the time information and position information for the flying object 520 to the coping system 330 by way of the communication system 320.

<Flying Object Coping System 1000>

The flying object coping system 1000 includes: the surveillance system 310 composed of multiple surveillance satellites 100 each equipped with a surveillance device and a communication device, and a surveillance ground center 311 that transmits directive commands to a surveillance satellite group; the communication system 320 having multiple communication satellites 200 each including a communication device, and a communication ground center 321 that transmits directive commands to the communication satellite group; and the coping system 330 equipped with coping assets 332 on land, in sea, and in air for coping with a flying object 520. In the flying object coping system 1000, the surveillance system 310 transmits flying object information generated through surveillance of the flying object 520 to the coping system 330 by way of the communication system 320.

FIG. 6 illustrates information transmitted from the surveillance ground center 311 to the communication ground center 321. Reference is made to FIG. 6.

The surveillance ground center 311 transmits, to the communication ground center 321, notification information including:

(1) an ID of a surveillance satellite that is scheduled to transmit the flying object information;

(2) scheduled transmission time information indicating a scheduled transmission time of the flying object information;

(3) position information indicating the position of the surveillance satellite having the ID of (1) at the scheduled transmission time;

(4) an ID of a surveillance satellite that is scheduled to receive the flying object information;

(5) scheduled reception time information indicating a scheduled time of receiving the flying object information;

(6) position information indicating the position of "another surveillance satellite" at the scheduled reception time; and (7) position information of the coping asset 332.

As illustrated in FIG. 6, the communication ground center 321 is equipped with a communication route search device 470, which searches for a communication route for satellite information. By using the communication route search device 470, the communication ground center 321 generates a directive command on the basis of the notification information including the (1) to (7) above transmitted from the surveillance ground center 311 and transmits the generated directive command to the communication satellite group of the communication system 320.

Figure 2:
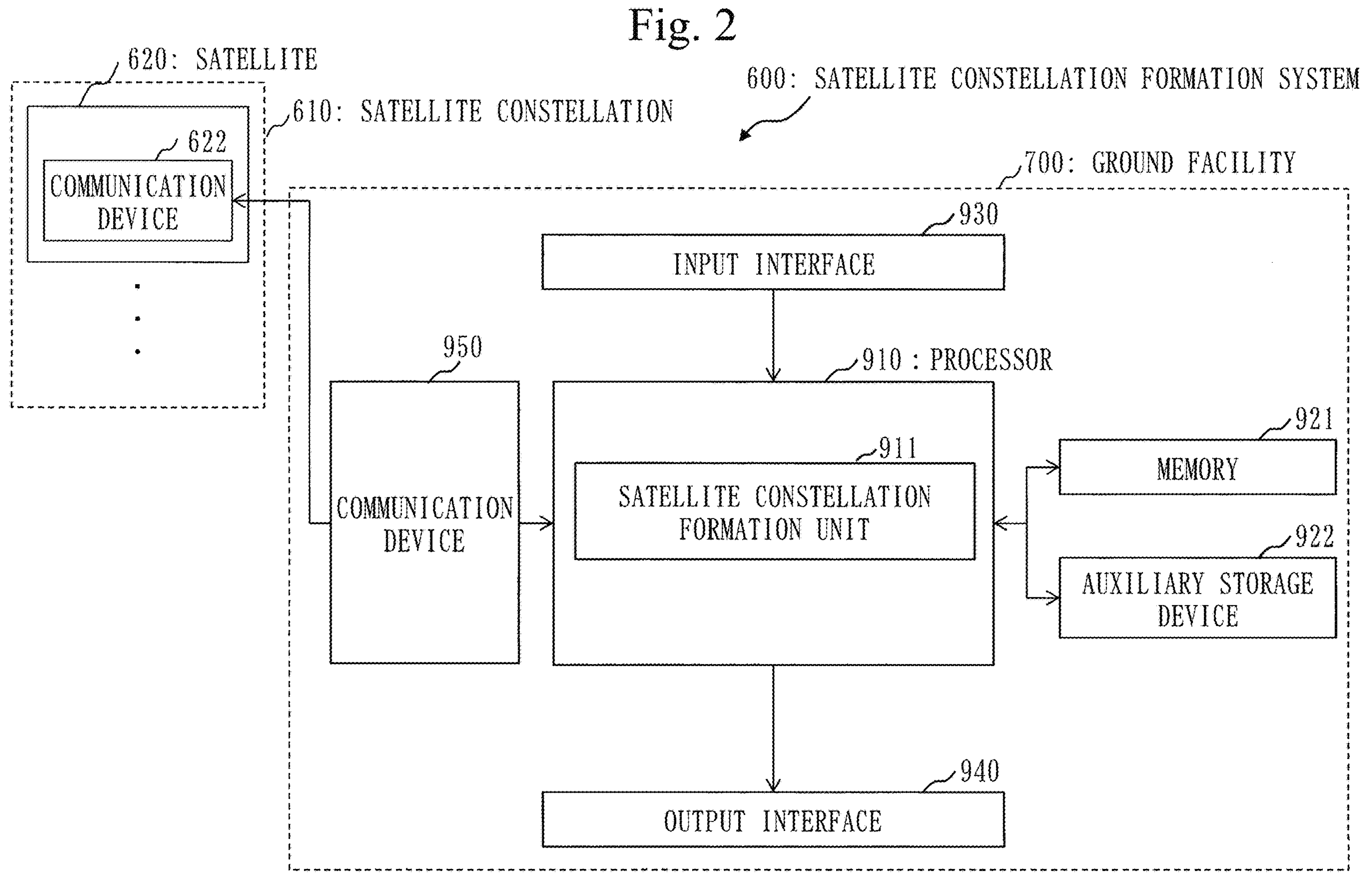
FIG. 2 is a diagram of Embodiment 1, illustrating an exemplary configuration of a satellite constellation formation system 600.

With FIGS. 2 to 4, examples of a satellite 620 and a ground facility 700 in a satellite constellation formation system 600, which forms a satellite constellation 610, are described. The satellite constellation formation system 600 may be referred to just as satellite constellation.

FIG. 2 is an exemplary configuration of the satellite constellation formation system 600. The satellite constellation formation system 600 includes a computer. Although FIG. 2 illustrates a configuration of a single computer, in practice, computers will be provided in the respective satellites 620 of multiple satellites constituting the satellite constellation 610 and in the ground facility 700, which communicates with the satellites 620. Then, the computers provided in the respective satellites 620 of the multiple satellites and in the ground facility 700, which communicates with the satellites 620, cooperate with each other to implement the functions of the satellite constellation formation system 600. In the following, an example of configuration of a computer for implementing the functions of the satellite constellation formation system 600 will be described.

The satellite constellation formation system 600 includes the satellites 620 and the ground facility 700. Each satellite 620 includes a communication device 622 for communicating with a communication device 950 of the ground facility 700. FIG. 2 illustrates the communication device 622 from the components of the satellite 620.

The satellite constellation formation system 600 includes a processor 910 and also has other pieces of hardware such as a memory 921, an auxiliary storage device 922, an input interface 930, an output interface 940, and the communication device 950. The processor 910 is connected with the other pieces of hardware over signal lines and controls the other pieces of hardware.

The satellite constellation formation system 600 includes a satellite constellation formation unit 911 as a functional element. Functions of the satellite constellation formation unit 911 are implemented by hardware or software. The satellite constellation formation unit 911 controls formation of the satellite constellation 610 while communicating with the satellite 620.

FIG. 3 is an example of configuration of the satellite 620 of the satellite constellation formation system 600. The satellite 620 includes a satellite control device 621, the communication device 622, a propulsion device 623, an attitude control device 624, and a power supply device 625. While the satellite 620 may include other components for implementing various functions, in FIG. 3, the satellite control device 621, the communication device 622, the propulsion device 623, the attitude control device 624, and the power supply device 625 will be described. The satellite 620 of FIG. 3 is an example of a communication satellite 200 equipped with the communication device 622.

The satellite control device 621 is a computer for controlling the propulsion device 623 and the attitude control device 624 and includes a processing circuit. Specifically, the satellite control device 621 controls the propulsion device 623 and the attitude control device 624 in accordance with various commands transmitted from the ground facility 700.

The communication device 622 is a device that communicates with the ground facility 700. Alternatively, the communication device 622 is a device that communicates with front and rear satellites 620 on the same orbital plane or satellites 620 on adjacent orbital planes. Specifically, the communication device 622 transmits various types of data related to its own satellite to the ground facility 700 or to other satellites 620. The communication device 622 also receives various commands transmitted from the ground facility 700. The propulsion device 623 is a device providing thrust to the satellite 620 and changes a speed of the satellite 620. The attitude control device 624 is a device for controlling attitude elements, such as an attitude of the satellite 620 and an angular speed and line-of-sight direction of the satellite 620. The attitude control device 624 changes the attitude elements in desired directions. Alternatively, the attitude control device 624 maintains the attitude elements in desired directions. The attitude control device 624 includes an attitude sensor, an actuator, and a controller. The attitude sensor is a device such as a gyroscope, an earth sensor, a sun sensor, a star tracker, a thruster, and a magnetic sensor. The actuator is a device such as an attitude control thruster, a momentum wheel, a reaction wheel, and a control moment gyro. The controller controls the actuator in accordance with measurement data from the attitude sensor or various commands from the ground facility 700. The power supply device 625 includes units such as a solar cell, a battery, and a power control device and supplies electric power to the units mounted on the satellite 620.

The processing circuit included in the satellite control device 621 is described. The processing circuit may be dedicated hardware or may be a processor that executes programs stored in the memory. In the processing circuit, some of the functions may be implemented in dedicated hardware and the remaining functions may be implemented in software or firmware. That is, the processing circuit can be embodied by hardware, software, firmware, or a combination thereof. Dedicated hardware is, specifically, a single circuit, a composite circuit, a programmed processor, a parallel-programmed processor, an ASIC, an FPGA, or a combination thereofASIC is an abbreviation for Application Specific Integrated Circuit. FPGA is an abbreviation for Field Programmable Gate Array.

FIG. 4 is another example of configuration of the satellite 620 of the satellite constellation formation system 600. The satellite 620 of FIG. 4 includes a surveillance device 626 in addition to the configuration of FIG. 3. The surveillance device 626 is a device that monitors objects. Specifically, the surveillance device 626 is a device for monitoring or observing objects such as space objects, flying objects, or moving objects on land, in sea, or in air. The surveillance device 626 is also called an observation device. For example, the surveillance device 626 is an infrared surveillance device that detects a temperature rise caused by atmospheric friction when a flying object enters the atmosphere with infrared. The surveillance device 626 detects plume of a flying object upon launch or the temperature of the flying object itself. Alternatively, the surveillance device 626 may be information collection device based on light wave or radio wave. The surveillance device 626 may also be a device that detects an object via optics. The surveillance device 626 uses optics to image an object that is flying at an altitude different from the orbital altitude of an observation satellite. Specifically, the surveillance device 626 may be a visible light sensor. The satellite 620 of FIG. 4 is an example of a surveillance satellite 100 equipped with the surveillance device 626 and the communication device 622. The surveillance satellite 100 may include multiple surveillance devices 626. The surveillance satellite 100 may also include multiple types of surveillance devices.

<Method of Forming Satellite Constellation>

The satellite constellation 610 formed by the satellite constellation formation system 600 will be described. The satellite constellation 610 is formed through control of the satellites 620 by the ground facility 700.

Figure 5:
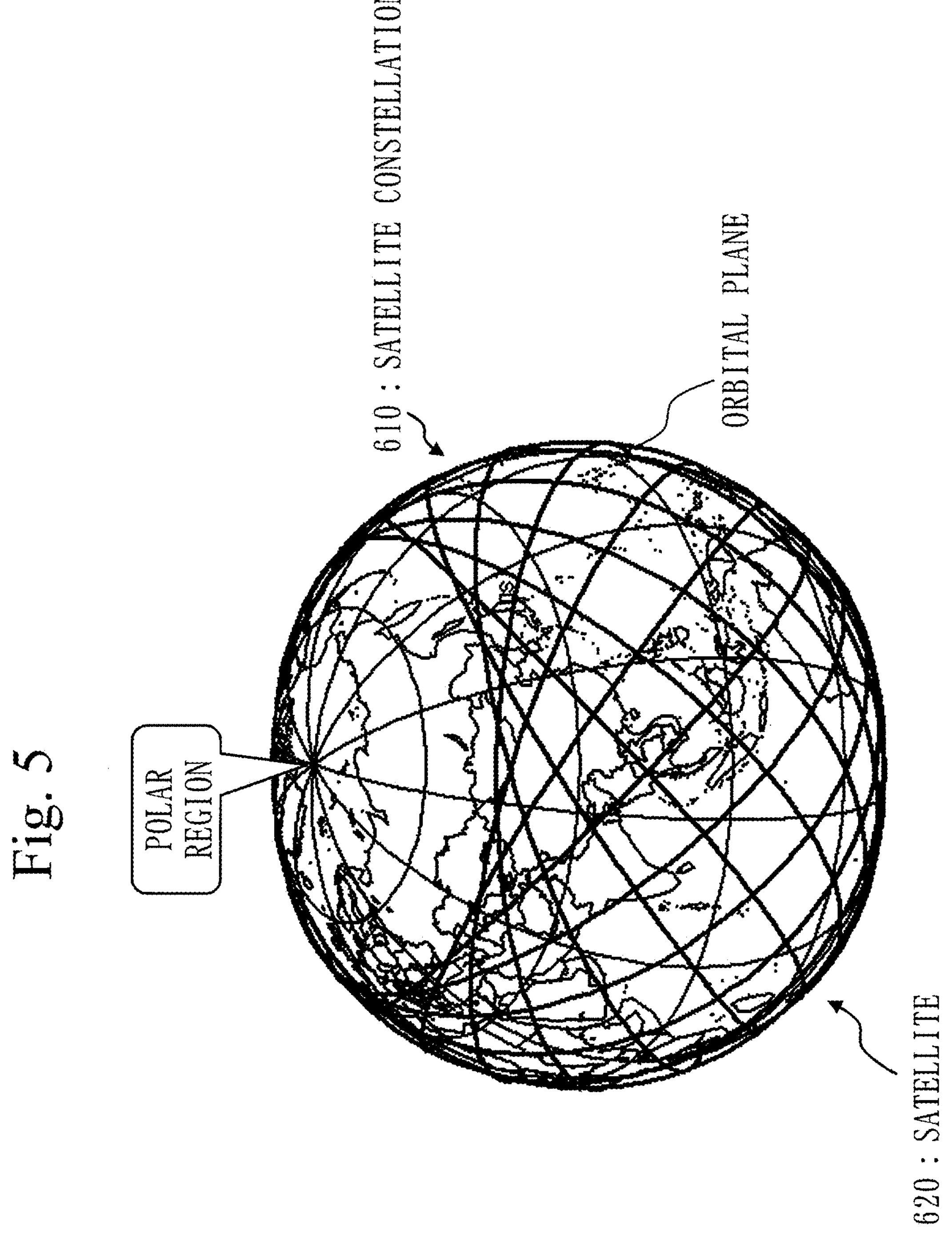
FIG. 5 is a diagram of Embodiment 1, illustrating an example of a satellite constellation 610 with multiple orbital planes that intersect in other than polar regions.

FIG. 5 is a diagram illustrating an example of the satellite constellation 610 with multiple orbital planes that intersect in other than polar regions, as an example of the satellite constellation 610. The surveillance system 310 and the communication system 320 are formed as the satellite constellation 610. In the satellite constellation 610 of FIG. 5, the orbits are inclined orbits.

The surveillance system 310 has multiple surveillance satellites 100 each equipped with an infrared surveillance device. The multiple surveillance satellites 100 make the infrared surveillance device detect the launch plume of the flying object 520 and the flying object 520 flying with an increased temperature, illustrated in FIG. 1, as a high-temperature target, and transmit information including a time of detection at which the infrared surveillance device detected the high-temperature target and at least either position information of position information indicating the position of surveillance satellite 100 including the infrared surveillance device and position information indicating the position of the flying object, as flying object information.

The multiple communication satellites 200 provided in the communication system 320 cross-link through the communication devices mounted on them to form a communication network. As illustrated in FIG. 6, the communication ground center 321 uses the communication route search device 470 to search for a communication path as a shortest route for information transmission, and transmits information transmission commands to the communication satellites 200 that constitute the communication path found.

FIG. 7 is a diagram illustrating information transmitted from the surveillance ground center 311 to the communication ground center 321. Reference is made to FIG. 7. After a surveillance satellite A included in the surveillance system 310 detected the launch of the flying object 520, the surveillance ground center 311 acquires launch detection information transmitted by the surveillance satellite A via the communication satellites 200.

Based on the launch detection information, the surveillance ground center 311 also communicates, to the communication ground center 321, information including:

(1) the ID of the surveillance satellite A;

(2) a launch detection time indicating a time of the launch detection; and (3) position information indicating the position of the surveillance satellite A, as transmitting-side information for flying object information.

The communication ground center 321 transmits information including the launch detection time of the flying object 520 and position information indicating the position of at least either of the flying object and the surveillance satellite A to a coping ground center 331 as communication center-side flying object information.

Reference is made to FIG. 7. The communication ground center 321 uses the communication route search device 470 to perform a search for the shortest route on a communication network formed by the communication satellite group from position coordinates at which the surveillance satellite A originated the flying object information to the position coordinates of the coping asset 332, transmits an information transmission command to the communication satellite group on the communication path as the shortest route, and transmits information including the launch detection time of the flying object and at least either position information of position information indicating the position of the surveillance satellite A and position information indicating a launch point position of the flying object, to the coping ground center 331 as flying object information.

Figure 8:
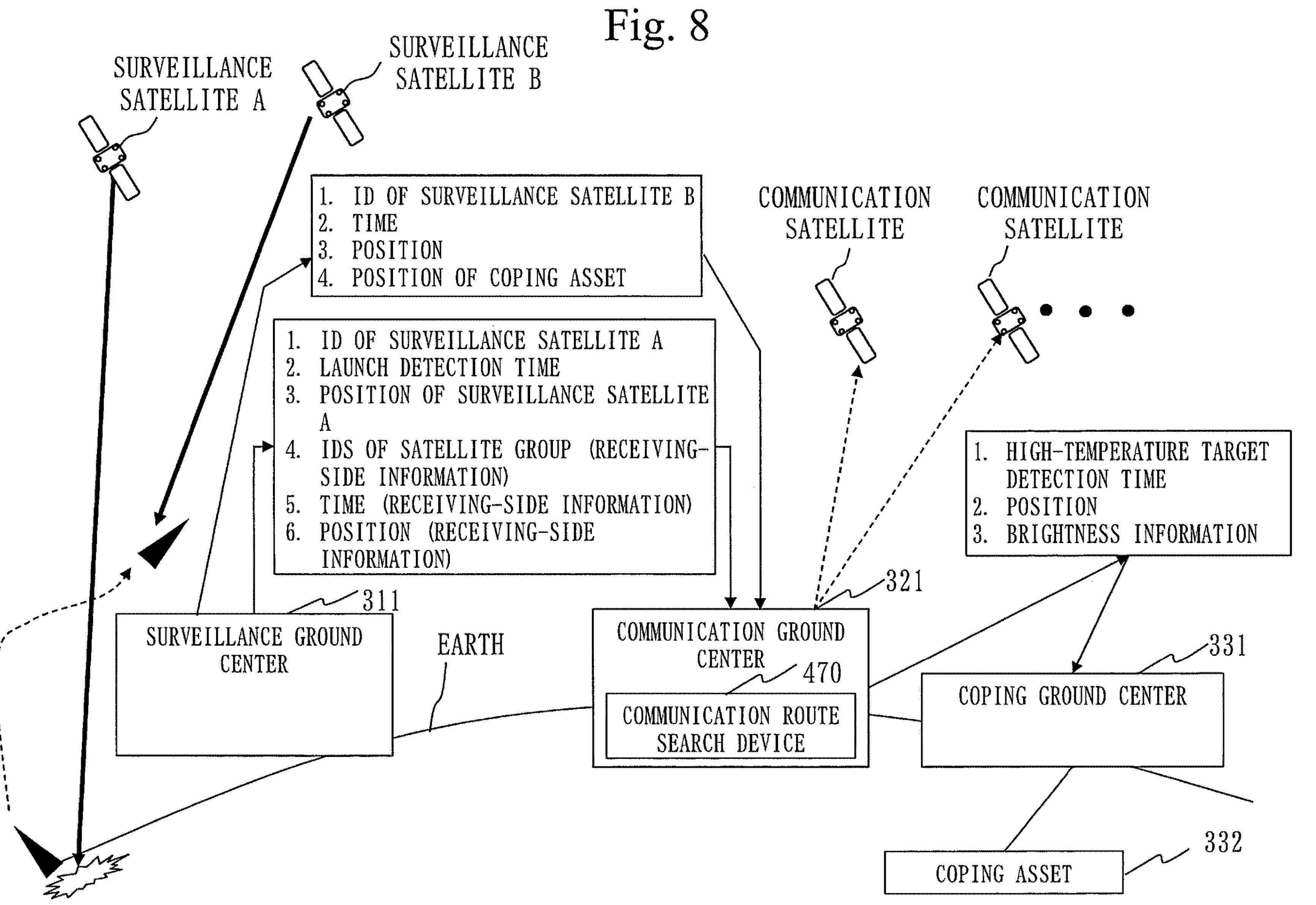
FIG. 8 is a diagram of Embodiment 1, illustrating information transmitted from the surveillance ground center 311 to the communication ground center 321.

FIG. 8 is a diagram illustrating information transmitted from the surveillance ground center 311 to the communication ground center 321.

Reference is made to FIG. 8. The surveillance ground center 311 communicates, to communication ground center 321:

(1) the ID of the surveillance satellite A;

(2) the launch detection time of the flying object; and (3) position information indicating the position of the surveillance satellite A at the launch detection time, as transmitting-side information for surveillance center-side flying object information, and communicates:

(4) the IDs of a surveillance satellite group flying around the surveillance satellite A;

(5) a time at which a succeeding satellite, which is a surveillance satellite included in the surveillance satellite group, is scheduled to receive the transmitting-side information; and (6) position information indicating a position at which the succeeding satellite is scheduled to receive the transmitting-side information, as receiving-side information for the surveillance center-side flying object information. The surveillance ground center 311 transmits flying object information to the surveillance satellite group flying around the surveillance satellite A after the launch of the flying object by way of the communication system 320. After a surveillance B (a nearby satellite) detected a high-temperature target, the surveillance ground center 311 communicates, to the communication ground center 321:

(1) the ID of the surveillance satellite B;

(2) a time of detection at which the surveillance satellite B detected the high-temperature target; and (3) position information indicating the position of the surveillance satellite B at the time of detection, as transmitting-side information for the surveillance center-side flying object information, and communicates:

(4) position information of the coping asset 332 as receiving-side information for the surveillance center-side flying object information. The communication ground center 321 uses the communication route search device 470 to perform a search for the shortest route on a communication network of the communication satellite group from the position coordinates indicated by the position information of the surveillance satellite B to the position coordinates of the coping system 330, and transmits an information transmission command to the communication satellite group on the communication path as the shortest route. The communication ground center 321 transmits, to the coping ground center 331:

(1) the time of detection of the high-temperature target;

(2) position coordinates indicating the position of the surveillance satellite B at the time of detection; and (3) brightness information based on the detection by the surveillance satellite B, as communication center-side flying object information.

FIG. 9 is a diagram illustrating information transmitted from the surveillance ground center 311 to the communication ground center 321.

Reference is made to FIG. 9. The surveillance ground center 311 communicates, to the communication ground center 321:

(1) an ID of the surveillance satellite B;

(2) the time of detection of the high-temperature target by the surveillance satellite B; and (3) position information indicating the position of the surveillance satellite B at the time of detection, as transmitting-side information for surveillance center-side flying object information, and communicates:

(4) the IDs of a surveillance satellite group flying around the surveillance satellite B;

(5) a time at which a succeeding satellite, which is a surveillance satellite included in the surveillance satellite group, is scheduled to receive the transmitting-side information; and (6) position information indicating a position at which the succeeding satellite is scheduled to receive the transmitting-side information, as receiving-side information for the surveillance center-side flying object information.

The communication ground center 321 transmits the surveillance center-side flying object information to the surveillance satellite group flying near the surveillance satellite B by way of communication satellites of the communication system 320. When a surveillance satellite C detected a high-temperature target, the surveillance ground center 311 communicates, to the communication ground center 321:

(1) an ID of the surveillance satellite C;

(2) the time of detection of the high-temperature target by the surveillance satellite C;

(3) position information indicating the position of the surveillance satellite C at the time of detection, as transmitting-side information for surveillance center-side flying object information, and communicates:

(4) position information indicating the position of the coping asset 332, as receiving-side information for the surveillance center-side flying object information.

The communication ground center 321 uses the communication route search device 470 to perform a search for the shortest route on a communication network from the position coordinates of the surveillance satellite C to the position coordinates of the coping asset 332, and transmits an information transmission command to the communication satellite group on the communication path as the shortest route.

The communication ground center 321 also transmits the time of detection of the high-temperature target by the surveillance satellite C, the position coordinates indicating the position of the surveillance satellite C at the time of detection, and brightness information based on the detection by the surveillance satellite C to the coping system as flying object information.

FIG. 10 is a diagram illustrating information transmitted from the surveillance ground center 311 to the communication ground center 321. Reference is made to FIG. 10. The surveillance ground center 311 communicates, to the communication ground center 321:

(1) an ID of the surveillance satellite N;

(2) the time of detection of the high-temperature target by the surveillance satellite N; and (3) position information indicating the position of the surveillance satellite N at the time of detection, as transmitting-side information for surveillance center-side flying object information, and communicates:

(4) the IDs of a satellite group flying around the surveillance satellite N;

(5) a time at which a succeeding satellite, which is a surveillance satellite included in the surveillance satellite group, is scheduled to receive the transmitting-side information; and (6) position information indicating a position at which the succeeding satellite is scheduled to receive the transmitting-side information, as receiving-side information for the surveillance center-side flying object information.

The communication ground center 321 transmits the surveillance center-side flying object information to a surveillance satellite group flying near the surveillance satellite N by way of the communication satellites of the communication system 320.

When a surveillance satellite N+1 detected a high-temperature target, the surveillance ground center 311 communicates, to the communication ground center 321:

(1) an ID of the surveillance satellite N+1;

(2) the time of detection of the high-temperature target by the surveillance satellite N+1;

(3) position information indicating the position of the surveillance satellite N+1 at the time of detection, as transmitting-side information for flying object information, and communicates:

(4) position information of the coping asset 332, as receiving-side information for the surveillance center-side flying object information.

The communication ground center 321 uses the communication route search device 470 to perform a search for the shortest route on a communication network from the position coordinates of the surveillance satellite N+1 to the position coordinates of the coping asset 332, transmits an information transmission command to the communication satellite group on the communication path as the shortest route, and transmits, to the coping ground center 331:

(1) the time of detection of the high-temperature target by the surveillance satellite N+1:

(2) position coordinates indicating the position of the surveillance satellite N+1 at the time of detection; and (3) brightness information based on the detection by the surveillance satellite N+1, as communication center-side flying object information.

FIG. 11 is a diagram illustrating a flight path prediction device 490 of the coping system 330. Reference is made to FIG. 11. The coping system 330 includes multiple coping assets 332 and the coping ground center 331. The coping ground center 331 is equipped with the flight path prediction device 490. The flight path prediction device 490 generates flight path prediction information consisting of a future time and position information on the basis of transition of time-series position information for flying object information.

FIG. 12 is a diagram where the coping system 330 has multiple coping assets. Reference is made to FIG. 12. The coping system 330 includes multiple coping assets 332 and the coping ground center 331. The coping ground center 331 is equipped with a coping asset selection device 333. The coping asset selection device 333 is connected with the coping assets 332 by communication circuits 334. The coping asset selection device 333 selects a coping asset 332 that is located near position coordinates which is predicted to be passed or reached by a flying object based on flight path prediction information generated by the flight path prediction device 490, and transmits a command signal on a coping action to it.

The flight path prediction device 490 of the coping system 330 may also be configured to predict a moving direction of the flying object from the position coordinates of the surveillance satellite B or the surveillance satellite C or the surveillance satellite N or the surveillance satellite N+1 which detected a high-temperature target after the surveillance satellite A transmitted launch detection information, and to generate flight path prediction information.

Reference is made to FIG. 12. The coping asset selection device 333 selects a coping asset 332 that is located near flight path prediction information generated by the flight path prediction device 490 from multiple coping assets 332 at different position coordinates from each other. The coping ground center 331 transmits flying object information and a coping action command to the coping asset 332.

Figure 13:
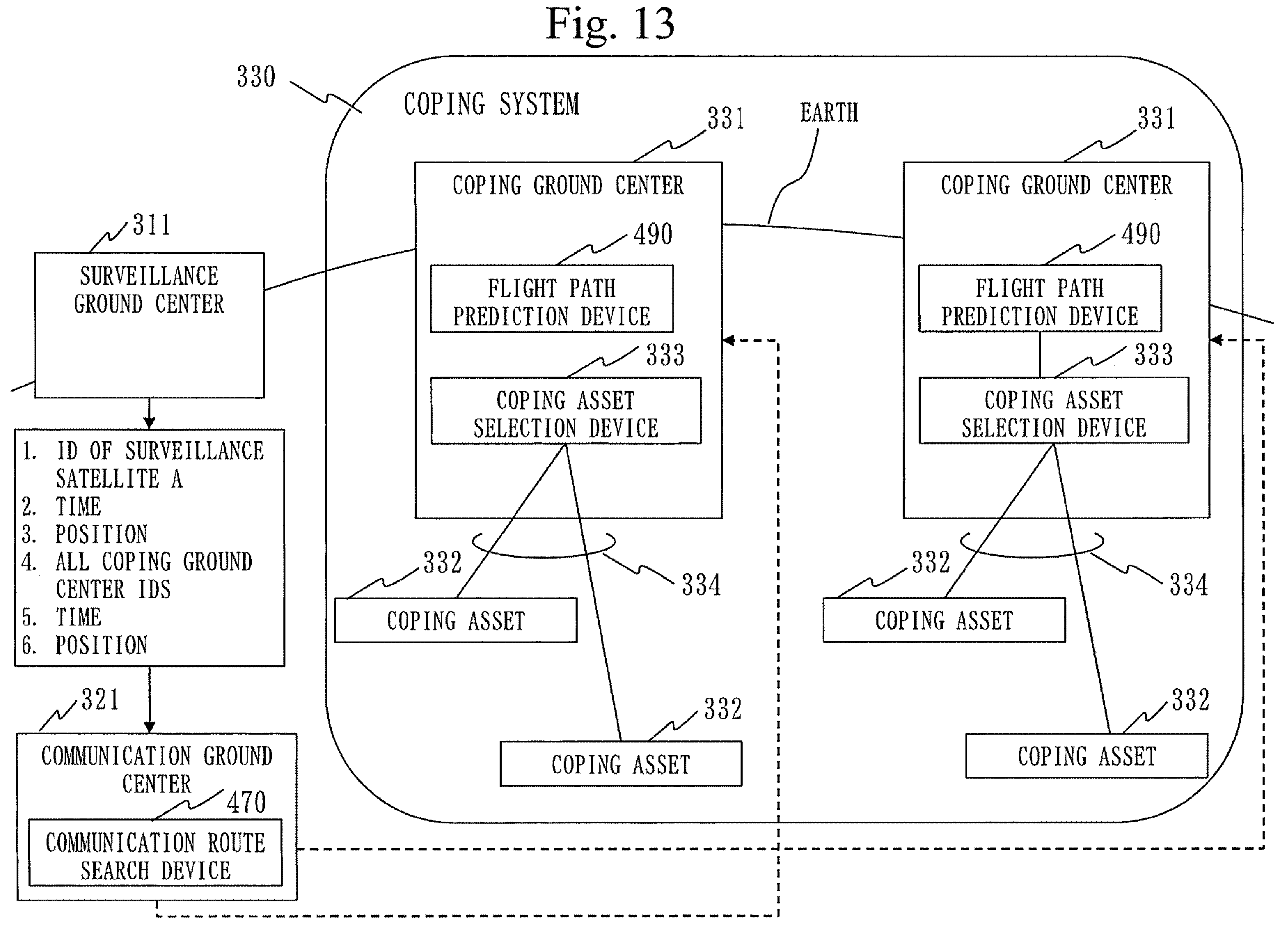
FIG. 13 is a diagram of Embodiment 1, illustrating information transmitted from the surveillance ground center 311 to the communication ground center 321.

FIG. 13 is a diagram illustrating information transmitted from the surveillance ground center 311 to the communication ground center 321. Reference is made to FIG. 13. The coping system 330 has multiple coping ground centers 331 at different position coordinates. The surveillance ground center 311 communicates, to the communication ground center 321:

(1) the ID of the surveillance satellite A;

(2) the time of detection at which the surveillance satellite A detected the launch of the flying object; and (3) position information indicating the position of the surveillance satellite A at the time of detection, as transmitting-side information for the flying object information, and communicates:

(4) the IDs of all of the coping assets 332;

(5) a time at which the coping ground centers 331 should receive surveillance center-side flying object information; and (6) position information indicating the positions of the coping ground centers 331, as receiving-side information for the surveillance center-side flying object information. The communication ground center 321 transmits flying object information for which the launch was detected by the surveillance satellite A to all of the coping ground centers 331.

Figure 14:
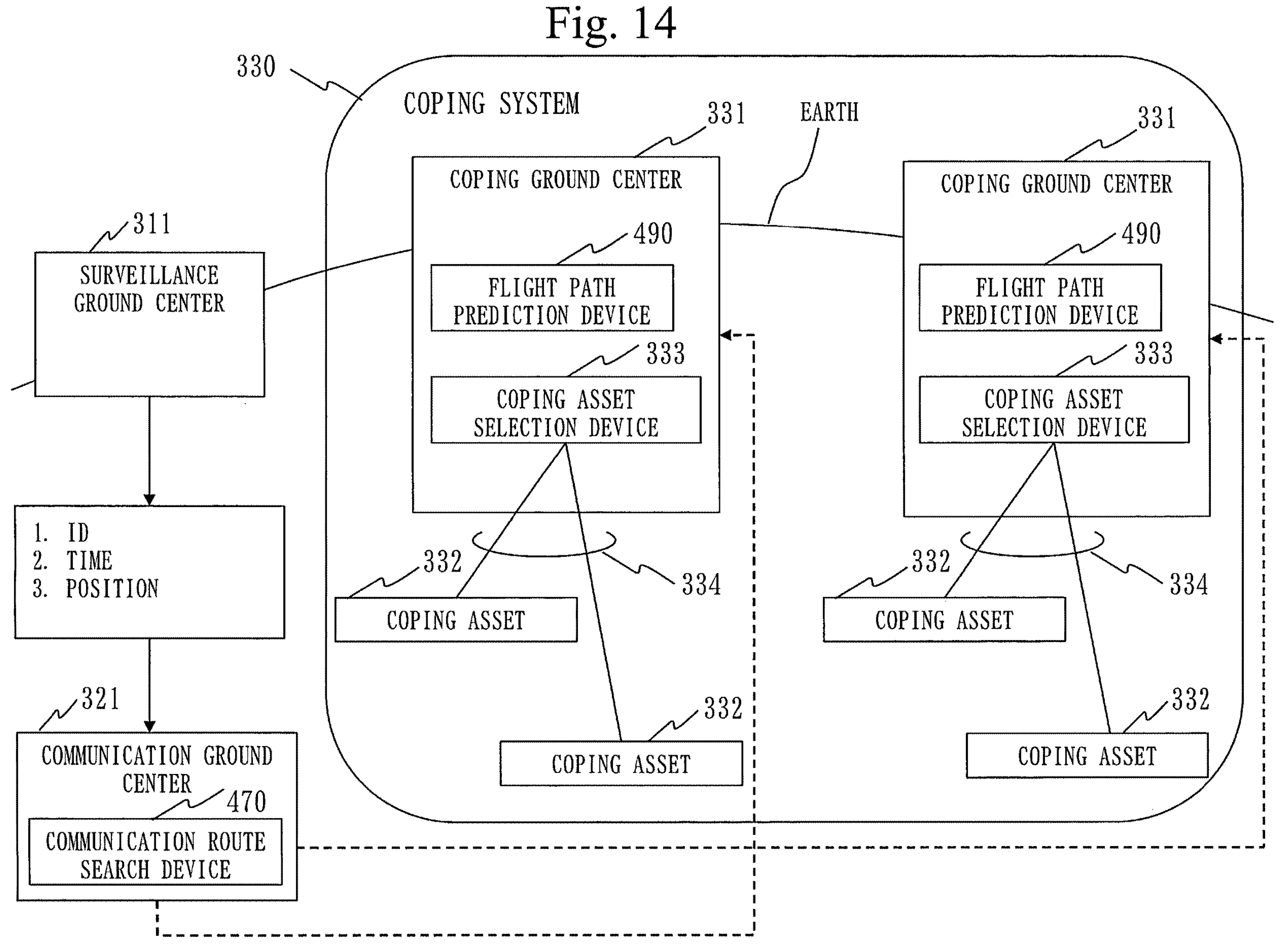
FIG. 14 is a diagram of Embodiment 1, illustrating information transmitted from the surveillance ground center 311 to the communication ground center 321.

FIG. 14 is a diagram illustrating information transmitted from the surveillance ground center 311 to the communication ground center 321. Reference is made to FIG. 14. The surveillance ground center 311 communicates, to the communication ground center 321:

(1) an ID of the coping ground center 331 that is located near flight path prediction information generated by the flight path prediction device 490;

(2) a time of reception at which the coping ground center 331 should receive flying object information; and (3) position information indicating the position of the coping ground center, as receiving-side information for the flying object information. The communication ground center 321 transmits the flying object information to the coping ground center 331.

Figure 15:
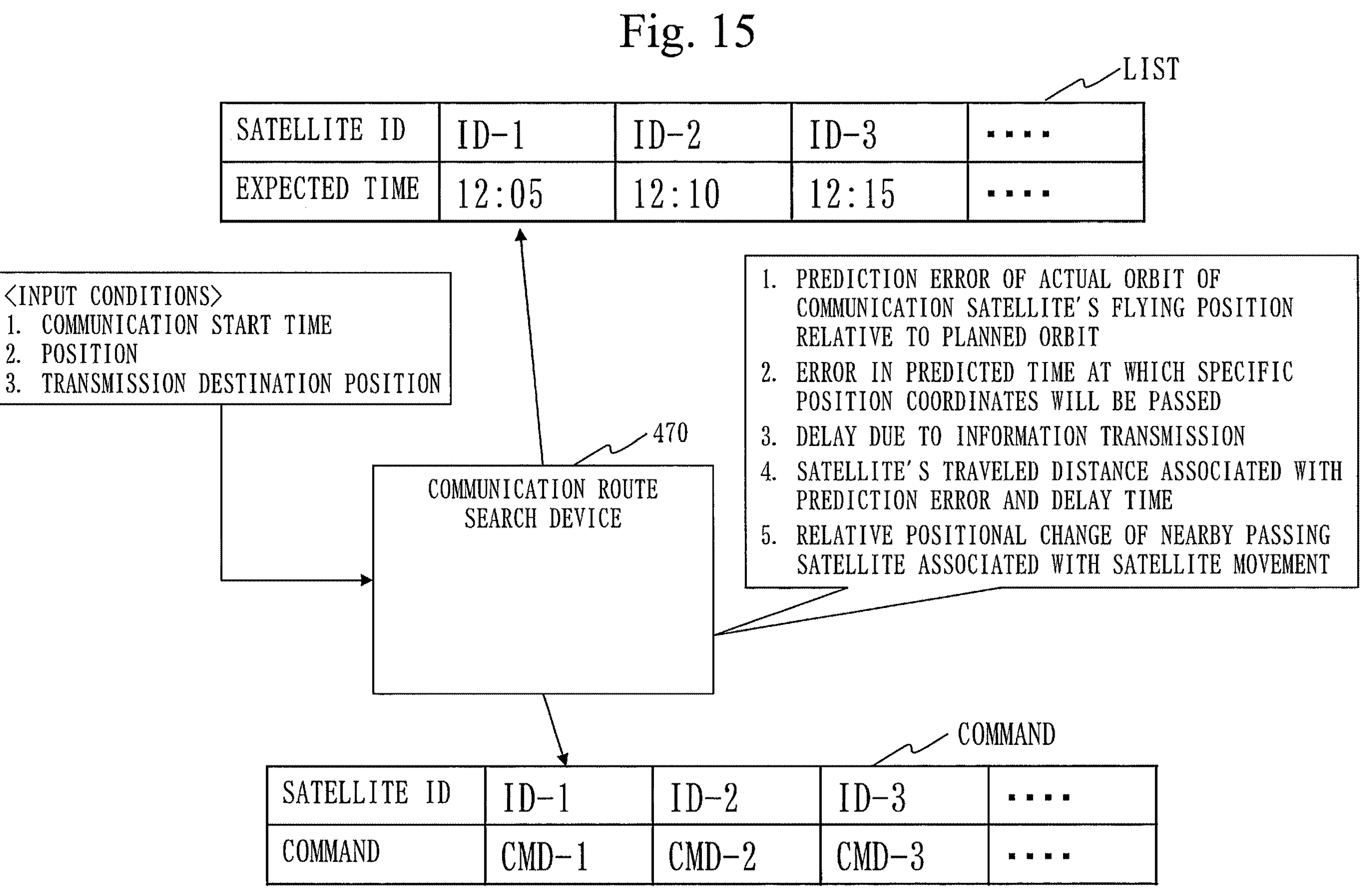
FIG. 15 is a diagram of Embodiment 1, illustrating processing by a communication route search device 470.

FIG. 15 illustrates the communication route search device 470 provided in the communication ground center 321.

Reference is made to FIG. 15.

The communication route search device 470 takes, as input conditions, the following:

(1) communication start time;

(2) position coordinates; and (3) the position coordinates of a transmission destination to which the flying object information is transmitted.

The communication route search device 470 searches for an optimal route in the form of a sequence of satellite IDs through which the flying object information will be transmitted, and produces, as products, a list of the series of satellite IDs and expected times at which the corresponding satellites respectively transmit the flying object information to the next satellite, and commands for giving communication commands to the communication satellite group.

The communication route search device 470 searches for an optimal route that transmits flying object information in a shortest time, with subjects of analysis for route search including:

(1) a prediction error of an actual orbit of a communication satellite's flying position relative to a planned orbit;

(2) an error in a predicted time at which specific position coordinates will be passed;

(3) a delay due to information transmission;

(4) a satellite's traveled distance associated with the prediction error and the delay time; and (5) relative positional change of a nearby passing satellite associated with satellite movement.

FIG. 16 illustrates the communication route search device 470 provided in the communication ground center 321.

Reference is made to FIG. 16. In response to a launch detection signal from a surveillance satellite as a communication start command, the communication route search device 470 takes, as input conditions, the following:

(1) the position coordinates of the surveillance satellite that issued the launch detection signal;

(2) the position coordinates at which the launch of the flying object was detected; and (3) a visual field change range of the surveillance satellite.

The communication route search device 470 searches for an optimal route in the form of a sequence of satellite IDs through which the flying object information will be transmitted, and produces, as products, a list of the series of satellite IDs and expected times at which the corresponding satellites respectively transmit the flying object information to the next satellite, and commands for giving communication commands to the communication satellite group.

The communication route search device 470 searches for the IDs of nearby passing surveillance satellites that can monitor the vicinity of the flying object launch point, including visual field change, and performs a search for a flying object information transmission time, a surveillance satellite ID, and an optimal route for transmitting the flying object information to the surveillance satellite ID.

FIG. 17 illustrates the communication route search device 470 provided in the communication ground center 321. Reference is made to FIG. 17. In response to a launch detection signal from a surveillance satellite as a communication start command, the communication route search device 470 takes, as input conditions, the following:

(1) the position coordinates of the surveillance satellite that issued the launch detection signal;

(2) the position coordinates at which the launch of the flying object was detected;

(3) a visual field change range of the surveillance satellite;

(4) the position coordinates of a surveillance satellite that issued a high temperature detection signal among the nearby passing surveillance satellite which transmitted flying object information in the past; and (5) position coordinates at which a high-temperature object was detected.

The communication route search device 470 searches for an optimal route in the form of a sequence of satellite IDs through which the flying object information will be transmitted, and produces, as products, a list of the series of satellite IDs and expected times at which the corresponding satellites respectively transmit the flying object information to the next satellite, and commands for giving communication commands to the communication satellite group. The communication route search device 470 searches for the IDs of nearby passing surveillance satellites that can monitor the vicinity of the high-temperature object detection position, including visual field change, and performs a search for a flying object information transmission time, a surveillance satellite ID, and an optimal route for transmitting the flying object information to the surveillance satellite ID.

Figure 18:
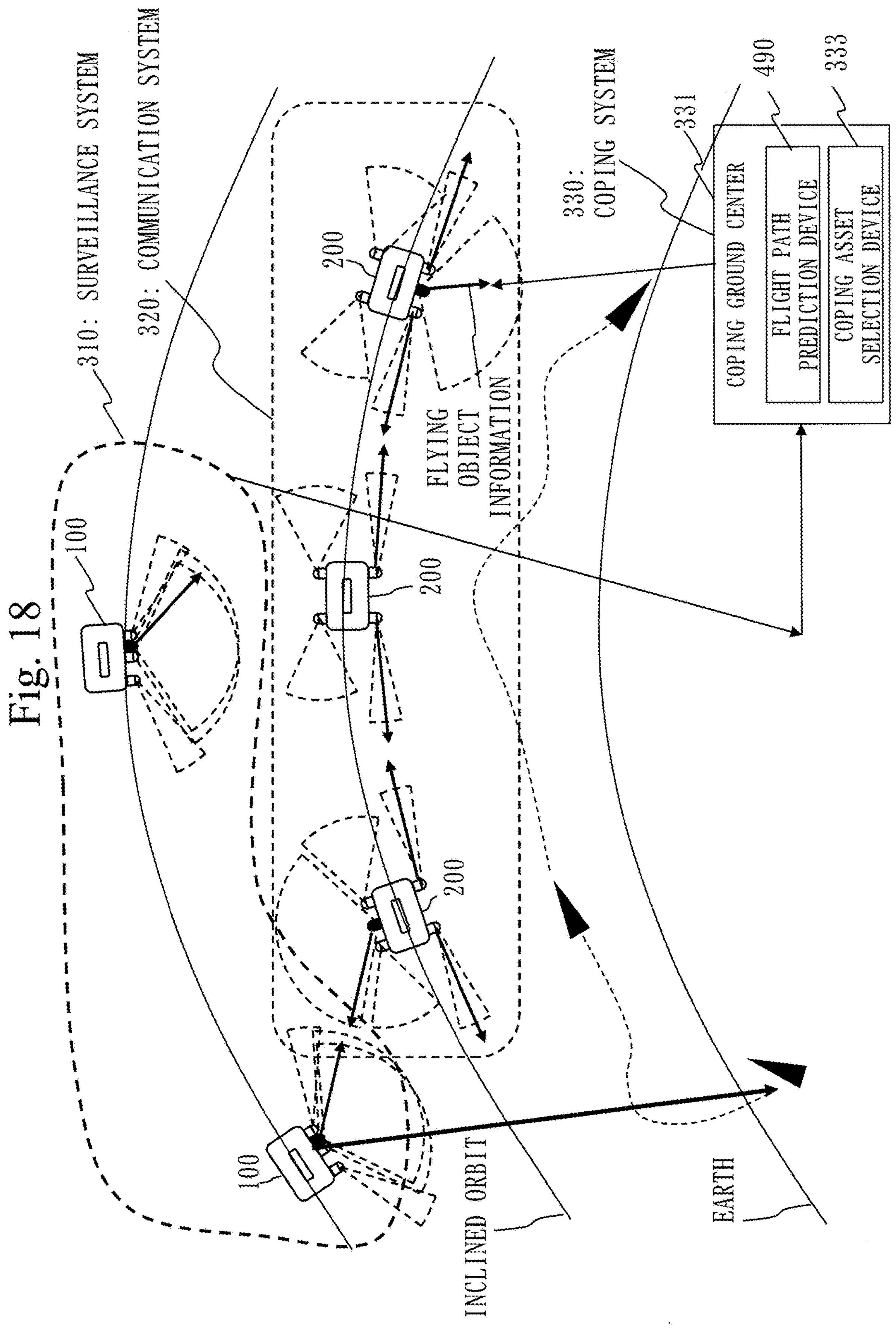
FIG. 18 is a diagram of Embodiment 1, illustrating processing by the flight path prediction device 490.

FIG. 18 illustrates processing by the flight path prediction device 490. Reference is made to FIG. 18. A surveillance satellite 100 equipped with multiple surveillance devices in the surveillance system 310 transmits, upon detection of a meaningful high-temperature target, detection time information, a surveillance satellite ID, a surveillance device ID, and surveillance data as flying object information to the coping ground center 331 by way of the communication system 320. The flight path prediction device 490 provided in the coping ground center 331 derives position information for the surveillance satellite with that ID at the time of detection in the flying object information, forwarding direction, and the line-of-sight direction of the surveillance device with that ID, extracts high-temperature target brightness from the surveillance data, and derives a line-of-sight vector oriented to the high-temperature object.

Figure 19:
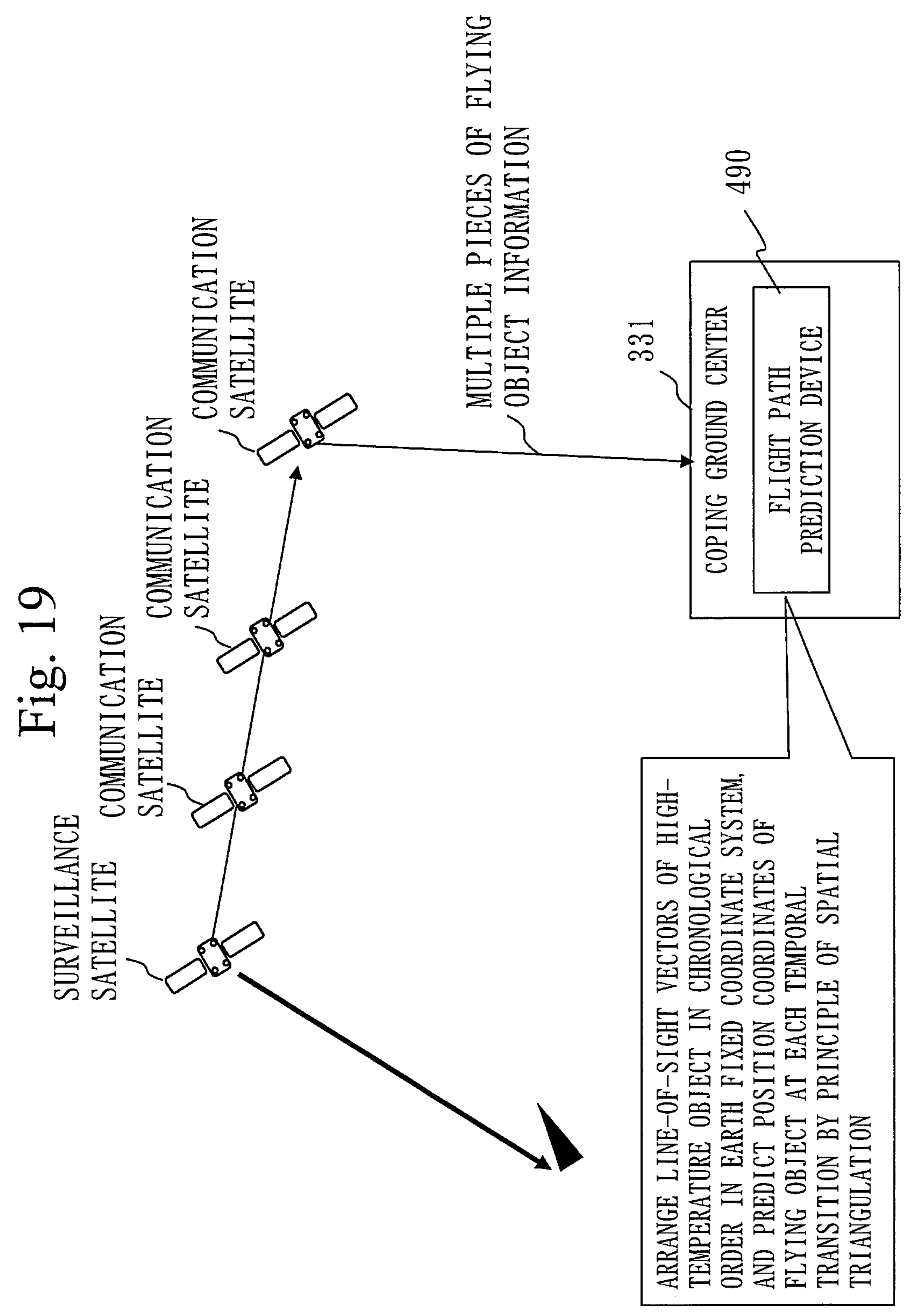
FIG. 19 is a diagram of Embodiment 1, illustrating processing by the flight path prediction device 490.

FIG. 19 illustrates processing by the flight path prediction device 490. Reference is made to FIG. 19. The flight path prediction device 490 provided in the coping ground center 331 arranges the line-of-sight vectors of the high-temperature object derived from flying object information from multiple surveillance satellites in chronological order in the earth fixed coordinate system, and predicts the position coordinates of the flying object at each temporal transition by the principle of spatial triangulation.

It may also be configured to, if multiple flying objects are launched at short intervals, aggregate flying object information acquired from multiple surveillance satellites and determine that a flying object of which path was predicted by the flight path prediction device is multiple distinct flying objects.

If multiple flying objects are launched from a nearby launch point at short intervals, it is necessary to correctly determine the number of launched flying objects within a short time because wrong recognition of the number of flying objects would lead to an uncontrollable risk. If visualization of the position coordinates of the flying object at each temporal transition as predicted by the flight path prediction device 490 reveals that the flight paths of the multiple flying objects are different, they can be determined as being distinct flying objects because flying position information will be dispersed. Should the multiple flying objects are flying on the same path, offsets in their position coordinates as a function of temporal transition of acquired information would manifest themself, so the objects can be determined as being distinct flying objects.

Effects of Embodiment 1

According to the flying object coping system 1000 in Embodiment 1, flying object information can be transmitted to a coping system in quasi-real time.

REFERENCE SIGNS LIST

100: surveillance satellite; 200: communication satellite; 310: surveillance system; 311: surveillance ground center; 320: communication system; 321: communication ground center; 330: coping system; 331: coping ground center; 332: coping asset; 333: coping asset selection device; 334: communication circuit; 470: communication route search device; 490: flight path prediction device; 510: the earth; 520: flying object; 600: satellite constellation formation system; 610: satellite constellation; 620: satellite; 621: satellite control device; 622: communication device; 623: propulsion device; 624: attitude control device; 625: power supply device; 626: surveillance device; 700: ground facility; 910: processor; 911: satellite constellation formation unit; 921: memory; 922: auxiliary storage device; 930: input interface; 940: output interface; 950: communication device; 1000: flying object coping system

The invention claimed is:

1. A flying object coping system comprising:

a surveillance system, including a plurality of surveillance satellites each including a surveillance device and a communication device, and a surveillance ground center to transmit directive commands to the plurality of surveillance satellites;

a communication system, including a plurality of communication satellites each including a communication device, and a communication ground center to transmit directive commands to a communication satellite group which is a group of the plurality of communication satellites; and a coping system including coping assets which are located at least one of on land, in sea, and in air and cope with a flying object, wherein the surveillance system transmits flying object information generated through surveillance of the flying object to the coping system by way of the communication system, the surveillance ground center transmits, to the communication ground center, notification information including an ID of a surveillance satellite that is scheduled to transmit the flying object information, scheduled transmission time information indicating a scheduled transmission time of the flying object information, position information indicating a position of the surveillance satellites having said ID at the scheduled transmission time, an ID of another surveillance satellite that is scheduled to receive the flying object information, scheduled reception time information indicating a scheduled reception time of receiving the flying object information, and position information indicating a position of the other surveillance satellite at the scheduled reception time, the communication ground center includes a communication route search device which searches for a communication route for the flying object information, and the communication route search device generates a directive command based on the notification information transmitted from the surveillance ground center and transmits the generated directive command to the communication satellite group included in the communication system.

2. The flying object coping system according to claim 1, wherein one or more surveillance satellites of the plurality of surveillance satellites include an infrared surveillance device, and the surveillance satellites with the infrared surveillance device make the infrared surveillance device detect launch plume of the flying object and the flying object flying with an increased temperature as a high-temperature target, and transmit information including a time of detection at which the infrared surveillance device detected the high-temperature target and at least either position information of position information indicating a position of the surveillance satellite with the infrared surveillance device and position information indicating a position of the flying object, as the flying object information.

3. The flying object coping system according to claim 1, wherein the communication satellites included in the communication system cross-link with each other via the communication devices to form a communication network, and the communication ground center searches for a communication path as a shortest route for information transmission using the communication route search device, and transmits an information transmission command to the communication satellites serving as the communication path found.

4. The flying object coping system according to claim 1, wherein after a surveillance satellite A included in the surveillance system detected a launch of the flying object, the surveillance ground center acquires launch detection information transmitted by the surveillance satellite A via the communication satellites, and based on the launch detection information, the surveillance ground center communicates, to the communication ground center, information including an ID of the surveillance satellite A, time information indicating a launch detection time of the launch detection, and position information indicating a position of the surveillance satellite A, as transmitting-side information for the flying object, and communicates position information indicating a position of the coping system as receiving-side information for the flying object, and the communication ground center transmits, to the coping system, information including the launch detection time of the flying object, and position coordinates indicating the position of at least one of the flying object and the surveillance satellite A, as center-side flying object information.

5. The flying object coping system according to claim 4, wherein the coping system includes a plurality of coping ground centers at different position coordinates, the surveillance ground center communicates, to the communication ground center, an ID of a surveillance satellite A, a time of detection at which the surveillance satellite A detected a launch of a flying object, and position information indicating a position of the surveillance satellite A at the time of detection, as transmitting-side information for surveillance center-side flying object information, the surveillance ground center communicates IDs of all of the coping ground centers, scheduled reception times at which the coping ground centers are to receive the surveillance center-side flying object information, and position information indicating positions of the coping ground centers, as receiving-side information for the surveillance center-side flying object information, and the communication ground center transmits flying object information for which a launch was detected by the surveillance satellite A to all of the coping ground centers.

6. The flying object coping system according to claim 1, wherein the communication ground center uses the communication route search device to perform a search for a shortest route on a communication network formed by the communication satellite group from position coordinates at which a surveillance satellite A originated the flying object information to position coordinates of the coping system, and transmits an information transmission command to the communication satellite group on a communication path as the shortest route, and also transmits information including a launch detection time of the flying object and at least either position information of position information indicating a position of the surveillance satellite A and position information indicating a launch point position of the flying object, to the coping system as flying object information.

7. The flying object coping system according to claim 1, wherein the surveillance ground center communicates, to the communication ground center, an ID of a surveillance satellite A, a launch detection time of the flying object, and position information indicating a position of the surveillance satellite A at the launch detection time, as transmitting-side information for surveillance center-side flying object information, the surveillance ground center communicates IDs of a surveillance satellite group flying around the surveillance satellite A, a time at which a succeeding satellite is scheduled to receive the transmitting-side information, the succeeding satellite being a surveillance satellite included in the surveillance satellite group, and position information indicating a position at which the succeeding satellite is scheduled to receive the transmitting-side information, as receiving-side information for the surveillance center-side flying object information, the surveillance ground center transmits the surveillance center-side flying object information to the surveillance satellite group flying around the surveillance satellite A after the launch of the flying object by way of the communication system, after a surveillance satellite B detected a high-temperature target, the surveillance ground center communicates, to the communication ground center, an ID of the surveillance satellite B, a time of detection at which the surveillance satellite B detected the high-temperature target, position information indicating a position of the surveillance satellite B at the time of detection, as transmitting-side information for the surveillance center-side flying object information, and communicates position information of the coping system as receiving-side information for the surveillance center-side flying object information, the communication ground center uses the communication route search device to perform a search for a shortest route on a communication network of the communication satellite group from a position indicated by the position information of the surveillance satellite B to a position of the coping system, and transmits an information transmission command to the communication satellite group on a communication path as the shortest route, and the communication ground center transmits, to the coping system, a time of detection of the high-temperature target, position coordinates indicating a position of the surveillance satellite B at the time of detection, and brightness information based on the detection by the surveillance satellite B, as communication center-side flying object information.

8. The flying object coping system according to claim 7, wherein the surveillance ground center communicates, to the communication ground center, an ID of the surveillance satellite B, a time of detection of the high-temperature target by the surveillance satellite B, and position information indicating the position of the surveillance satellite B at the time of detection, as transmitting-side information for surveillance center-side flying object information, the surveillance ground center communicates IDs of a surveillance satellite group flying around the surveillance satellite B, a time at which a succeeding satellite is scheduled to receive the transmitting-side information, the succeeding satellite being a surveillance satellite included in the surveillance satellite group, and position information indicating a position at which the succeeding satellite is scheduled to receive the transmitting-side information, as receiving-side information for the surveillance center-side flying object information, the communication ground center transmits the surveillance center-side flying object information to a surveillance satellite group flying near the surveillance satellite B by way of the communication system, when a surveillance satellite C detected a high-temperature target, the surveillance ground center communicates, to the communication ground center, an ID of the surveillance satellite C, a time of detection of the high-temperature target by the surveillance satellite C, and position information indicating a position of the surveillance satellite C at the time of detection, as transmitting-side information for the surveillance center-side flying object information, the surveillance ground center communicates position information indicating a position of the coping system as receiving-side information for the surveillance center-side flying object information, the communication ground center uses the communication route search device to perform a search for a shortest route on a communication network from position coordinates of the surveillance satellite C to position coordinates of the coping system, and transmits an information transmission command to the communication satellite group on a communication path as the shortest route, and the communication ground center transmits, to the coping system, a time of detection of the high-temperature target by the surveillance satellite C, position coordinates indicating the position of the surveillance satellite C at the time of detection, and brightness information based on the detection by the surveillance satellite C, as communication center-side flying object information.

9. The communication route search device provided in the flying object coping system according to claim 7, wherein the flying object coping system includes the communication route search device, in response to a launch detection signal from a surveillance satellite as a communication start command, and taking, as input conditions, position coordinates of the surveillance satellite that issued the launch detection signal, position coordinates at which a launch of a flying object was detected, and a visual field change range of the surveillance satellite, the communication route search device searches for an optimal route in a form of a sequence of satellite IDs through which flying object information will be transmitted, and produces, as products, a list of a series of satellite IDs and expected times at which corresponding satellites respectively transmit the flying object information to a next satellite, and commands for giving communication commands to the communication satellite group, and the communication route search device searches for IDs of nearby passing surveillance satellites that can monitor a vicinity of a flying object launch point, including visual field change, and performs a search for a flying object information transmission time, a surveillance satellite ID, and an optimal route for transmitting the flying object information to the surveillance satellite ID.

10. The flying object coping system according to claim 8, wherein the surveillance ground center communicates, to the communication ground center, an ID of a surveillance satellite N, a time of detection of the high-temperature target by the surveillance satellite N, and position information indicating a position of the surveillance satellite N at the time of detection, as transmitting-side information for surveillance center-side flying object information, the surveillance ground center communicates IDs of a surveillance satellite group flying around the surveillance satellite N, a time at which a succeeding satellite is scheduled to receive the transmitting-side information, the succeeding satellite being a surveillance satellite included in the surveillance satellite group, and position information indicating a position at which the succeeding satellite is scheduled to receive the transmitting-side information, as receiving-side information for the surveillance center-side flying object information, the communication ground center transmits the surveillance center-side flying object information to the surveillance satellite group flying near the surveillance satellite N by way of the communication satellites of the communication system, when a surveillance satellite N+1 detected a high-temperature target, the surveillance ground center communicates, to the communication ground center, an ID of the surveillance satellite N+1, a time of detection of the high-temperature target by the surveillance satellite N+1, and position information indicating a position of the surveillance satellite N+1 at the time of detection, as transmitting-side information for the surveillance center-side flying object information, the surveillance ground center communicates position information indicating a position of the coping system as receiving-side information for the surveillance center-side flying object information, the communication ground center uses the communication route search device to perform a search for a shortest route on a communication network from position coordinates of the surveillance satellite N+1 to position coordinates of the coping system, and transmits an information transmission command to the communication satellite group on a communication path as the shortest route, and the communication ground center transmits, to the coping system, a time of detection of the high-temperature target by the surveillance satellite N+1, position coordinates indicating the position of the surveillance satellite N+1 at the time of detection, and brightness information based on the detection by the surveillance satellite N+1, as communication center-side flying object information.

11. The communication route search device provided in the flying object coping system according to claim 8, wherein in response to a launch detection signal from a surveillance satellite as a communication start command, and taking, as input conditions, position coordinates of the surveillance satellite that issued the launch detection signal, position coordinates at which a launch of a flying object was detected, a visual field change range of the surveillance satellite, position coordinates of a surveillance satellite that issued a high temperature detection signal among nearby passing surveillance satellites which transmitted flying object information in past, and position coordinates at which a high-temperature object was detected, the communication route search device searches for an optimal route in a form of a sequence of satellite IDs through which flying object information will be transmitted, and produces, as products, a list of a series of satellite IDs and expected times at which corresponding satellites respectively transmit the flying object information to a next satellite, and commands for giving communication commands to the communication satellite group, and the communication route search device searches for IDs of nearby passing surveillance satellites that can monitor a vicinity of a high-temperature object detection position, including visual field change, and performs a search for a flying object information transmission time, a surveillance satellite ID, and an optimal route for transmitting the flying object information to the surveillance satellite ID.

12. The flying object coping system according to claim 10, wherein the coping system includes a coping ground center having a flight path prediction device, and the flight path prediction device generates flight path prediction information including a future time and position information based on transition of time-series position information for flying object information, and if any surveillance satellite from the surveillance satellite B, the surveillance satellite C, the surveillance satellite N, and the surveillance satellite N+1 detects the high-temperature target after the surveillance satellite A transmitted launch detection information, the flight path prediction device predicts a moving direction of the flying object from position coordinates of the surveillance satellite that detected the high-temperature target and generates flight path prediction information.

13. The flying object coping system according to claim 1, wherein the coping system includes a plurality of coping assets and a coping ground center, the coping ground center includes a flight path prediction device, and the flight path prediction device generates flight path prediction information including a future time and position information based on transition of time-series position information for flying object information.

14. The flying object coping system according to claim 13, wherein the coping ground center includes a coping asset selection device that selects a coping asset, the coping asset selection device is connected with each coping asset by a communication circuit, and the coping asset selection device selects a coping asset to cope with a flying object based on the flight path prediction information generated by the flight path prediction device, and transmits a command signal commanding a coping action to the selected coping asset.

15. The flying object coping system according to claim 14, wherein the plurality of coping assets have different position coordinates from each other, the coping asset selection device selects a coping asset that is located near the flight path prediction information generated by the flight path prediction device from the plurality of coping assets, and the coping ground center transmits flying object information and a coping action command to the selected coping asset.

16. The coping asset selection device provided in the flying object coping system according to claim 14.

17. The flying object coping system according to claim 13, wherein the surveillance ground center communicates, to the communication ground center, an ID of the coping ground center that is located near the flight path prediction information generated by the flight path prediction device, a time of reception at which the coping ground center is to receive flying object information, and position information indicating a position of the coping ground center, as receiving-side information for surveillance center-side flying object information, and the communication ground center transmits flying object information to the coping ground center.

18. The coping ground center provided in the flying object coping system according to claim 13.

19. The flight path prediction device provided in the flying object coping system according to claim 13.

20. The surveillance ground center provided in the flying object coping system according to claim 1.

21. The communication route search device provided in the flying object coping system according to claim 1, wherein taking, as input conditions, a communication start time, position coordinates, and position coordinates of a transmission destination to which flying object information will be transmitted, the communication route search device searches for an optimal route in a form of a sequence of satellite IDs through which the flying object information will be transmitted, and produces, as products, a list of a series of satellite IDs and expected times at which corresponding satellites respectively transmit the flying object information to a next satellite, and commands for giving communication commands to the communication satellite group, and the communication route search device searches for an optimal route that transmits flying object information in a shortest time, with subjects of analysis for route search including a prediction error of an actual orbit of a communication satellite's flying position relative to a planned orbit, an error in a predicted time at which specific position coordinates will be passed, a delay due to information transmission, a satellite's traveled distance associated with the prediction error and a delay time, and relative positional change of a nearby passing satellite associated with satellite movement.

22. The flying object coping system according to claim 1, wherein when a surveillance satellite equipped with a plurality of surveillance devices detected a meaningful high-temperature target, the surveillance satellite transmits detection time information, a surveillance satellite ID, a surveillance device ID, and surveillance data as flying object information to the coping ground center by way of the communication system, and a flight path prediction device provided in the coping ground center derives position information for the surveillance satellite with said ID at a detection time in the flying object information, forwarding direction, and a line-of-sight direction of the surveillance device with said ID, and extracts high-temperature target brightness from the surveillance data, and derives a line-of-sight vector oriented to a high-temperature object.

23. The flying object coping system according to claim 22, wherein the flight path prediction device arranges line-of-sight vectors of the high-temperature object derived from the flying object information from a plurality of surveillance satellites in chronological order in an earth fixed coordinate system, and predicts position coordinates of the flying object at each temporal transition by the principle of spatial triangulation.

24. The flying object coping system according to claim 23, wherein the flight path prediction device repeatedly derives a result of prediction of flying object position coordinates at each temporal transition to visualize change in the position coordinates over temporal transition, and determines that a flying object for which path prediction has been made includes a plurality of distinct flying objects.

* * * * *